(12) United States Patent
Kim et al.

(10) Patent No.: US 12,456,203 B2
(45) Date of Patent: Oct. 28, 2025

(54) SUBSTRATE INSPECTING APPARATUS FOR OBTAINING SYNTHETIC IMAGE DATA AND METHOD OF INSPECTING SUBSTRATE BY OBTAINING SYNTHETIC IMAGE DATA

(71) Applicant: SAMSUNG DISPLAY CO., LTD., Yongin-si (KR)

(72) Inventors: Myoungchul Kim, Yongin-si (KR); Eonpil Shin, Yongin-si (KR); Donghoon Lee, Yongin-si (KR); Taejun Kim, Yongin-si (KR); Jihoon Seo, Yongin-si (KR); Moonkyoung Yong, Yongin-si (KR); Jiyong Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 486 days.

(21) Appl. No.: 17/960,324

(22) Filed: Oct. 5, 2022

(65) Prior Publication Data
US 2023/0215013 A1 Jul. 6, 2023

(30) Foreign Application Priority Data
Dec. 30, 2021 (KR) .......................... 10-2021-0193436

(51) Int. Cl.
*G06T 7/174* (2017.01)
*G06T 7/11* (2017.01)

(52) U.S. Cl.
CPC ................ *G06T 7/174* (2017.01); *G06T 7/11* (2017.01); *G06T 2207/30148* (2013.01)

(58) Field of Classification Search
CPC . G06T 7/174; G06T 7/11; G06T 2207/30148; G06T 2207/10056;
(Continued)

(56) References Cited

U.S. PATENT DOCUMENTS 7,989,729 B1 * 8/2011 Zhao ....................... H10F 71/00
219/121.76
8,320,658 B2 11/2012 Tanizaki et al.
(Continued)

FOREIGN PATENT DOCUMENTS

JP 4799329 B2 10/2011
JP 2020020592 A 2/2020
(Continued)

*Primary Examiner* — Mia M Thomas
(74) *Attorney, Agent, or Firm* — CANTOR COLBURN LLP

(57) ABSTRACT

A substrate inspection apparatus includes: an image sensor which obtains first image data of a first substrate and second image data of a second substrate; and a processor which obtains synthetic image data by using the first and second image data, where the processor obtains first first spot information and first non-spot information of a first first spot area and a first non-spot area on the first substrate, based on the first image data, obtain first second spot information and second non-spot information of a first second spot area and a second non-spot area on locations on the second substrate corresponding to locations of the first first spot area and the first non-spot area on the first substrate, based on the second image data, and obtain the synthetic image data by using the first first spot information, the first second spot information and the first and second non-spot information.

20 Claims, 8 Drawing Sheets

(58) Field of Classification Search
CPC ..... G06T 3/4038; G06T 7/001; G06T 7/0004; G06T 7/30; G01N 21/8851; G01N 21/9501; G01N 21/94; G01N 2021/8864; G01N 2021/8887; H01L 22/12; G01B 11/00; G01B 11/24; G01J 1/42; G01J 1/0228
See application file for complete search history.

(56) References Cited

U.S. PATENT DOCUMENTS

| | | | | |
|---|---|---|---|---|
| 10,711,294 | B2* | 7/2020 | Ota | G01B 11/00 |
| 11,568,576 | B1* | 1/2023 | Martinez | G06T 7/11 |
| 2008/0072423 | A1* | 3/2008 | Finn | G06K 19/07327 29/857 |
| 2015/0227829 | A1* | 8/2015 | Finn | B42D 15/00 438/118 |
| 2017/0132779 | A1* | 5/2017 | Chang | H04N 5/265 |
| 2017/0200263 | A1* | 7/2017 | Iwami | G06F 3/0445 |
| 2017/0221195 | A1* | 8/2017 | Iwami | G06F 3/044 |
| 2017/0221196 | A1* | 8/2017 | Yamaguchi | G06T 7/0004 |
| 2017/0243342 | A1* | 8/2017 | Iwami | H04N 23/88 |
| 2019/0297257 | A1* | 9/2019 | Ishibashi | H04N 23/90 |
| 2021/0064839 | A1* | 3/2021 | Lee | G06V 40/1318 |
| 2021/0312242 | A1* | 10/2021 | Jafarkhani | G06F 18/2148 |
| 2021/0348227 | A1* | 11/2021 | Baba | G06T 7/32 |
| 2022/0335679 | A1* | 10/2022 | Afrasiabi | G06T 15/50 |
| 2023/0081232 | A1* | 3/2023 | Weisenfeld | G06V 20/69 382/133 |
| 2023/0082268 | A1* | 3/2023 | Delaney | H04N 23/74 348/92 |
| 2023/0177676 | A1* | 6/2023 | Kim | G06T 7/001 348/126 |
| 2023/0215013 | A1* | 7/2023 | Kim | G06T 7/001 382/103 |
| 2023/0221262 | A1* | 7/2023 | Yamaguchi | G06T 7/0008 |
| 2023/0238078 | A1* | 7/2023 | Gonzalez Lozano | G06T 7/0012 382/128 |
| 2024/0012338 | A1* | 1/2024 | Cappelli | G03F 7/70633 |
| 2024/0060903 | A1* | 2/2024 | Kim | G01N 21/8851 |
| 2024/0074298 | A1* | 2/2024 | Kim | H10K 59/88 |
| 2024/0183792 | A1* | 6/2024 | Onishi | G01N 23/04 |

FOREIGN PATENT DOCUMENTS

| | | |
|---|---|---|
| KR | 1020070115067 A | 12/2007 |
| KR | 1020080061786 A | 7/2008 |
| KR | 100863341 B1 | 10/2008 |
| KR | 11020130014191 A | 2/2013 |

* cited by examiner

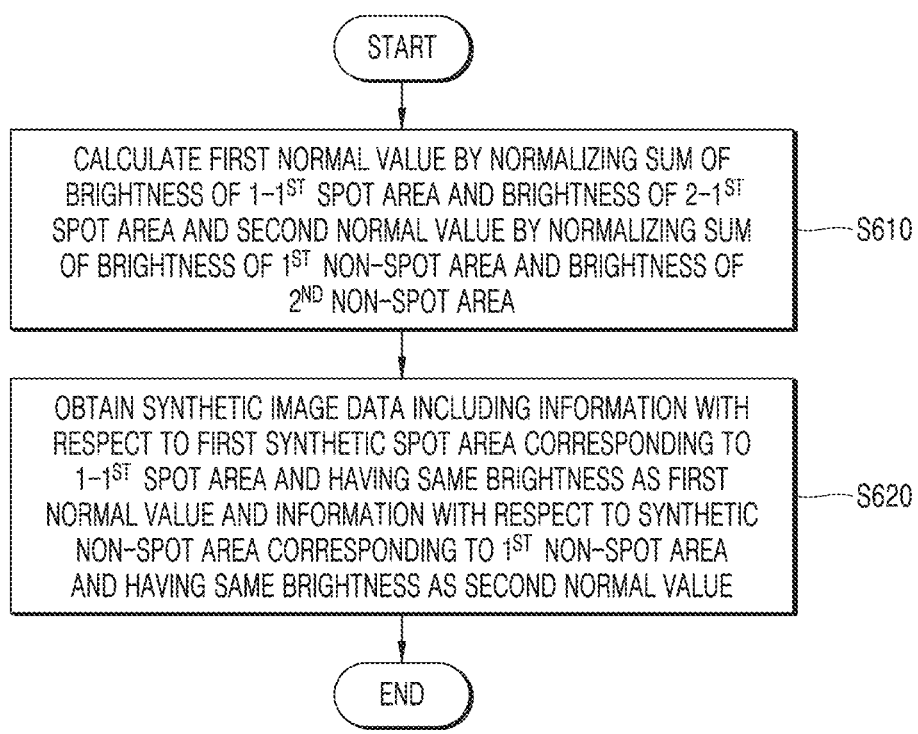

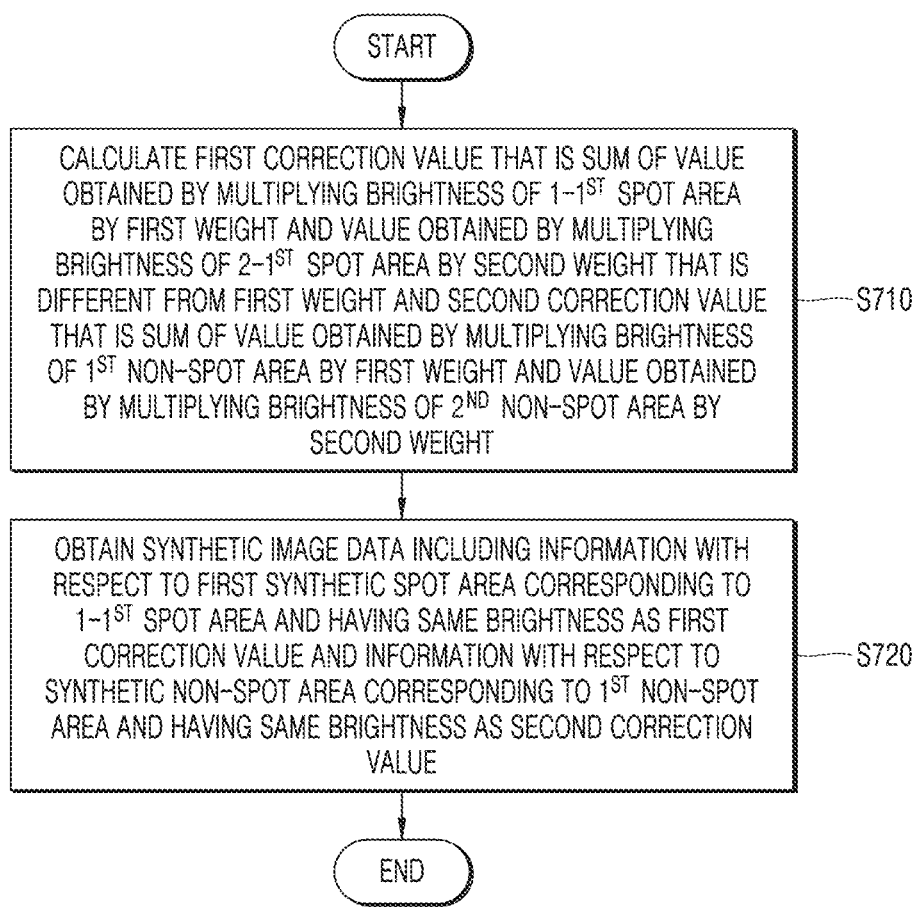

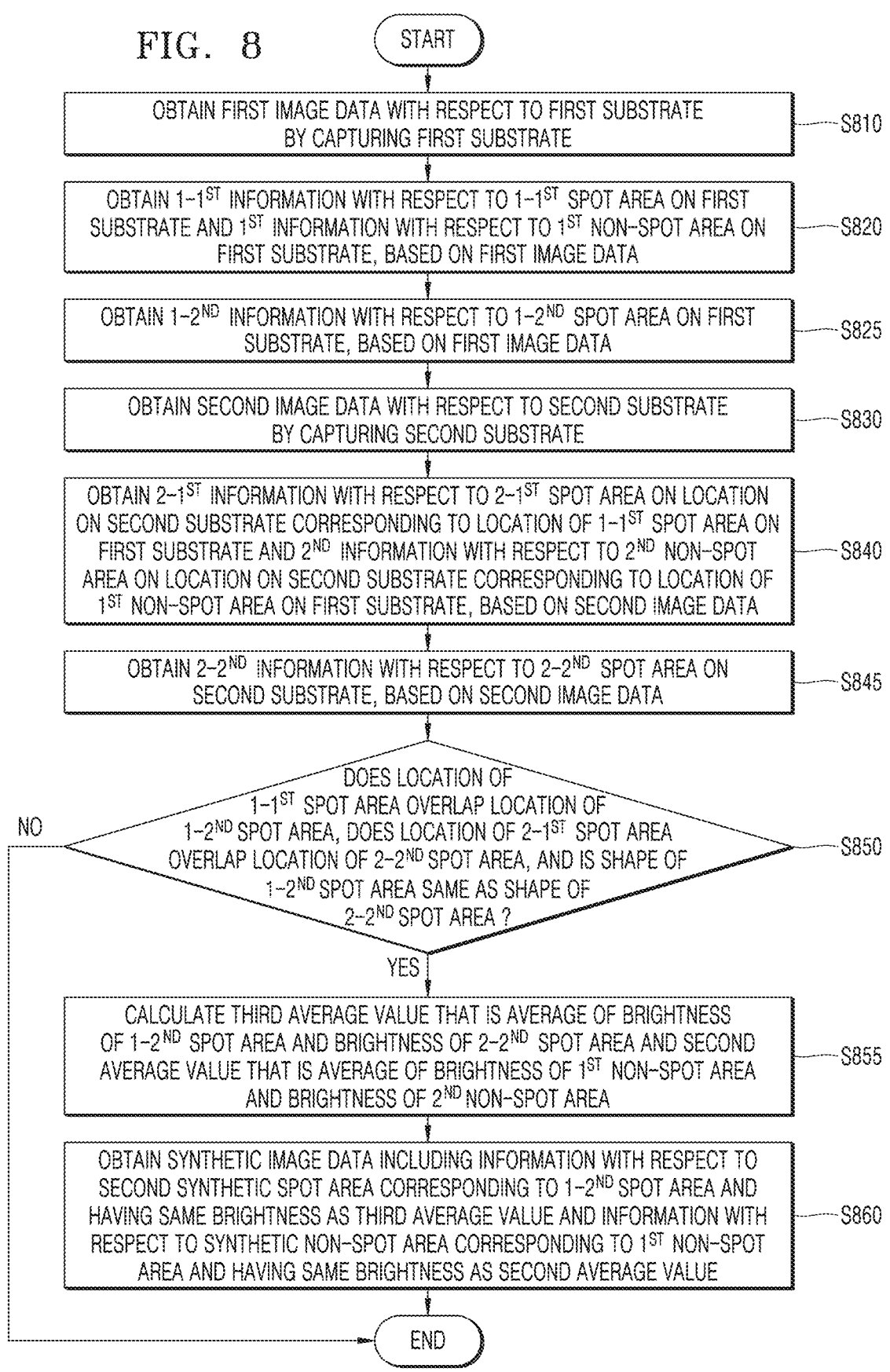

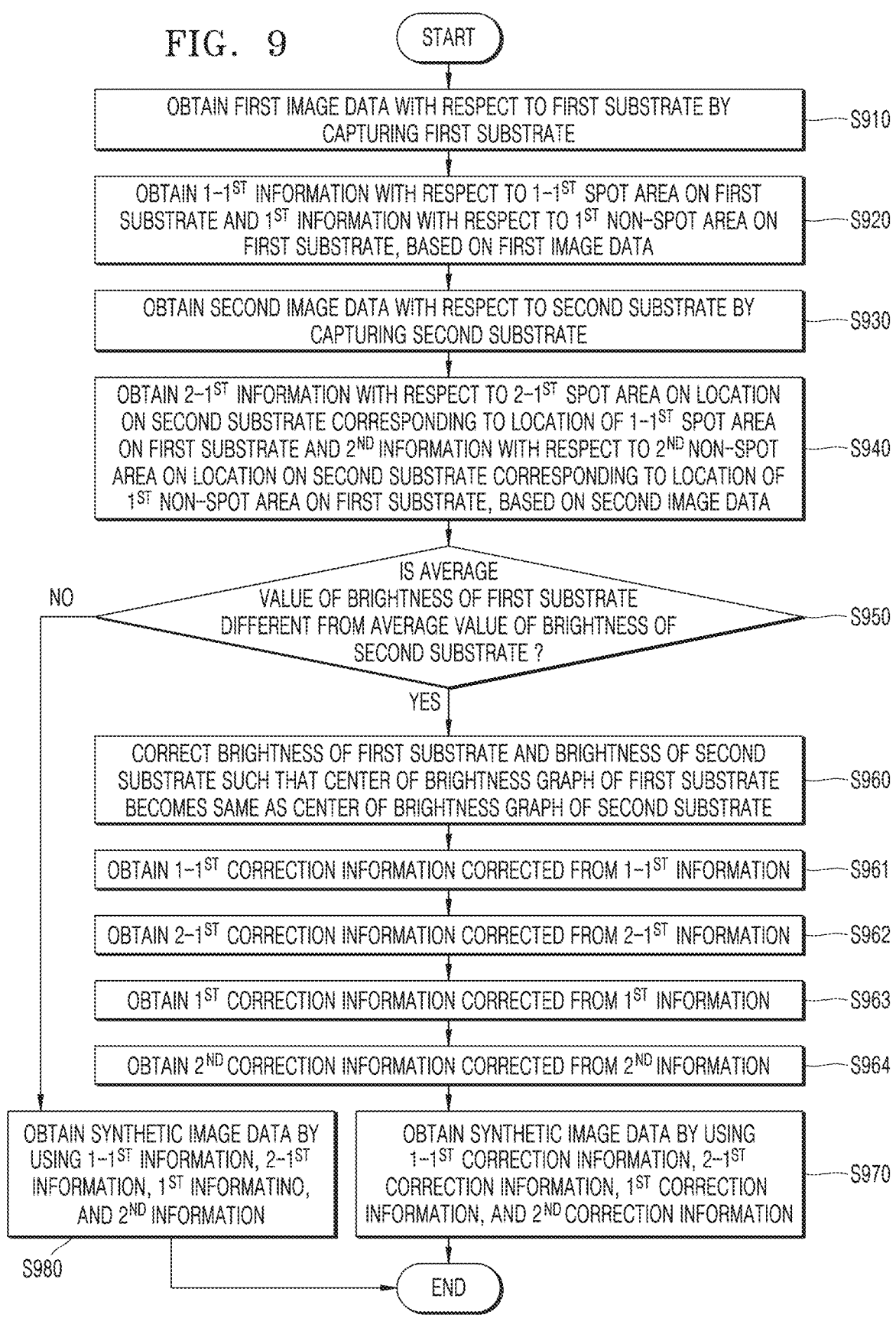

SUBSTRATE INSPECTING APPARATUS FOR OBTAINING SYNTHETIC IMAGE DATA AND METHOD OF INSPECTING SUBSTRATE BY OBTAINING SYNTHETIC IMAGE DATA

This application claims priority to Korean Patent Application No. 10-2021-0193436, filed on Dec. 30, 2021, and all the benefits accruing therefrom under 35 U.S.C. § 119, the content of which in its entirety is herein incorporated by reference.

BACKGROUND

1. Field

One or more embodiments relate to a substrate inspection apparatus and a method of inspecting a substrate, and more particularly, to a substrate inspection apparatus and a method of inspecting a substrate, with a high degree of detection of a spot generated in a same location with respect to a plurality of substrates.

2. Description of the Related Art

Spots may be generated on a substrate in a manufacturing process of a display apparatus, and some of the spots are generated in a same location with respect to a plurality of substrates. The spots generated in the same location with respect to the plurality of substrates may be due to a manufacturing facility, a process condition, or the like. An inspection of these spots may be conducted by an automated facility. In addition, the inspection of spots on a substrate being manufactured may also be conducted with the naked eye. This is done to prevent the criteria for spot determination from becoming excessively strict, since, after a display apparatus is manufactured, only some of the spots which are generated on the substrate undergoing manufacture and are detected by the automated facility are visible to a user.

SUMMARY

In a case where a conventional substrate inspection apparatus is used, some of the spots that are not visible to the naked eye during a manufacturing process may become visible to a user after a display apparatus is manufactured.

The disclosure provides a substrate inspection apparatus for increasing a degree of detection of a spot generated in a same location with respect to a plurality of substrates, from among spots that are visible to a user after a display apparatus is manufactured.

According to one or more embodiments, a substrate inspection apparatus includes an image sensor which obtains first image data with respect to a first substrate by capturing the first substrate and obtains second image data with respect to a second substrate by capturing the second substrate and a processor which obtains synthetic image data by using the first image data and the second image data, where the processor obtains first first spot information with respect to a first first spot area on the first substrate and first non-spot information with respect to a first non-spot area on the first substrate, based on the first image data, obtains first second spot information with respect to a first second spot area on a location on the second substrate corresponding to a location of the first first spot area on the first substrate and second non-spot information with respect to a second non-spot area on a location on the second substrate corresponding to a location of the first non-spot area on the first substrate, based on the second image data, and obtains the synthetic image data by using the first first spot information, the first second spot information, the first non-spot information, and the second non-spot information.

In an embodiment, the first first spot information may include a location of the first first spot area, a size of the first first spot area, a shape of the first first spot area, and a brightness of the first first spot area, the first second spot information may include a location of the first second spot area, a size of the first second spot area, a shape of the first second spot area, and a brightness of the first second spot area, the first non-spot information may include a location of the first non-spot area and a brightness of the first non-spot area, and the second non-spot information may include a location of the second non-spot area and a brightness of the second non-spot area.

In an embodiment, the processor may further calculate a first average value which is an average of the brightness of the first first spot area and the brightness of the first second spot area and a second average value which is an average of the brightness of the first non-spot area and the brightness of the second non-spot area, and the processor may obtain the synthetic image data including information with respect to a first synthetic spot area corresponding to the first first spot area and having a same brightness as the first average value and information with respect to a synthetic non-spot area corresponding to the first non-spot area and having a same brightness as the second average value.

In an embodiment, the processor may further calculate a first normal value and a second normal value, where the first normal value may be obtained by normalizing a sum of the brightness of the first first spot area and the brightness of the first second spot area and the second normal value may be obtained by normalizing a sum of the brightness of the first non-spot area and the brightness of the second non-spot area, and the processor may obtain the synthetic image data including information with respect to a first synthetic spot area corresponding to the first first spot area and having a same brightness as the first normal value and information with respect to a synthetic non-spot area corresponding to the first non-spot area and having a same brightness as the second normal value.

In an embodiment, the processor may further calculate the first normal value and the second normal value by subtracting a same value from each of the sum of the brightness of the first first spot area and the brightness of the first second spot area and the sum of the brightness of the first non-spot area and the brightness of the second non-spot area, such that an average value of the first normal value and the second normal value is the same as an average value of a brightness of the first substrate and a brightness of the second substrate.

In an embodiment, the processor may further calculate a first correction value and a second correction value, where the first correction value may be a sum of a value obtained by multiplying the brightness of the first first spot area by a first weight and a value obtained by multiplying the brightness of the first second spot area by a second weight different from the first weight, and the second correction value may be a sum of a value obtained by multiplying the brightness of the first non-spot area by the first weight and a value obtained by multiplying the brightness of the second non-spot area by the second weight, and the processor may obtain the synthetic image data including information with respect to a first synthetic spot area corresponding to the first first spot area and having a same brightness as the first correction value and information with respect to a synthetic non-spot area corresponding to the first non-spot area and having a same brightness as the second correction value.

In an embodiment, when a value obtained by subtracting the brightness of the first non-spot area from the brightness of the first first spot area is less than a value obtained by subtracting the brightness of the second non-spot area from the brightness of the first second spot area, the first weight may be less than the second weight.

In an embodiment, the processor may further obtain second first spot information with respect to a second first spot area on the first substrate, based on the first image data, and obtain second second spot information with respect to a second second spot area on the second substrate, based on the second image data. In such an embodiment, the second first spot information may include a location of the second first spot area, a size of the second first spot area, a shape of the second first spot area, and a brightness of the second first spot area, and the second second spot information may include a location of the second second spot area, a size of the second second spot area, a shape of the second second spot area, and a brightness of the second second spot area.

In an embodiment, the processor may further calculate a third average value and a second average value, when the location of the first first spot area overlaps the location of the second first spot area, the location of the first second spot area overlaps the location of the second second spot area, the shape of the first first spot area is the same as the shape of the first second spot area, and the shape of the second first spot area is the same as the shape of the second second spot area, where the third average value maybe an average of the brightness of the second first spot area and the brightness of the second second spot area, and the second average value may be an average of the brightness of the first non-spot area and the brightness of the second non-spot area, and the processor may obtain the synthetic image data including information with respect to a second synthetic spot area corresponding to the second first spot area and having a same brightness as the third average value and information with respect to a synthetic non-spot area corresponding to the first non-spot area and having a same brightness as the second average value.

In an embodiment, the processor may further correct a brightness of the first substrate and a brightness of the second substrate in a way such that a center of a brightness graph of the first substrate becomes the same as a center of a brightness graph of the second substrate, when an average value of the brightness of the first substrate is different from an average value of the brightness of the second substrate, obtain first first correction spot information corrected from the first first spot information, obtain first second correction spot information corrected from the first second information, obtain first correction non-spot information corrected from the first non-spot information, obtain second correction non-spot information corrected from the second non-spot information, and obtain the synthetic image data by using the first first correction spot information, the first second correction spot information, the first correction non-spot information, and the second correction non-spot information.

According to one or more embodiments, a method of inspecting a substrate includes obtaining first image data with respect to a first substrate by capturing the first substrate, obtaining first first spot information with respect to a first first spot area on the first substrate and first non-spot information with respect to a first non-spot area on the first substrate, based on the first image data, obtaining second image data with respect to a second substrate by capturing the second substrate, obtaining first second spot information with respect to a first second spot area on a location on the second substrate corresponding to a location of the first first spot area on the first substrate and second non-spot information with respect to a second non-spot area on a location on the second substrate corresponding to a location of the first non-spot area on the first substrate, based on the second image data, and obtaining synthetic image data by using the first first spot information, the first second spot information, the first non-spot information, and the second non-spot information.

In an embodiment, the first first spot information may include a location of the first first spot area, a size of the first first spot area, a shape of the first first spot area, and a brightness of the first first spot area, the first second spot information may include a location of the first second spot area, a size of the first second spot area, a shape of the first second spot area, and a brightness of the first second spot area, the first non-spot information may include a location of the first non-spot area and a brightness of the first non-spot area, and the second non-spot information may include a location of the second non-spot area and a brightness of the second non-spot area.

In an embodiment, the obtaining the synthetic image data may include calculating a first average value and a second average value, where the first average value may be an average of the brightness of the first first spot area and the brightness of the first second spot area and the second average value may be an average of the brightness of the first non-spot area and the brightness of the second non-spot area, and obtaining the synthetic image data including information with respect to a first synthetic spot area corresponding to the first first spot area and having a same brightness as the first average value and information with respect to a synthetic non-spot area corresponding to the first non-spot area and having a same brightness as the second average value.

In an embodiment, the obtaining the synthetic image data may include calculating a first normal value and a second normal value, where the first normal value may be obtained by normalizing a sum of the brightness of the first first spot area and the brightness of the first second spot area and the second normal value may be obtained by normalizing a sum of the brightness of the first non-spot area and the brightness of the second non-spot area, and obtaining the synthetic image data including information with respect to a first synthetic spot area corresponding to the first first spot area and having a same brightness as the first normal value and information with respect to a synthetic non-spot area corresponding to the first non-spot area and having a same brightness as the second normal value.

In an embodiment, the calculating the first normal value and the second normal value may include calculating the first normal value and the second normal value by subtracting a same value from each of the sum of the brightness of the first first spot area and the brightness of the first second spot area and the sum of the brightness of the first non-spot area and the brightness of the second non-spot area, such that an average value of the first normal value and the second normal value is the same as an average value of a brightness of the first substrate and a brightness of the second substrate.

In an embodiment, the obtaining the synthetic image data may include calculating a first correction value and a second correction value, where the first correction value may be a sum of a value obtained by multiplying the brightness of the first first spot area by a first weight and a value obtained by multiplying the brightness of the first second spot area by a second weight different from the first weight, and the second correction value may be a sum of a value obtained by multiplying the brightness of the first non-spot area by the first weight and a value obtained by multiplying the brightness of the second non-spot area by the second weight, and obtaining the synthetic image data including information with respect to a first synthetic spot area corresponding to the first first spot area and having a same brightness as the first correction value and information with respect to a synthetic non-spot area corresponding to the first non-spot area and having a same brightness as the second correction value.

In an embodiment, when a value obtained by subtracting the brightness of the first non-spot area from the brightness of the first first spot area is less than a value obtained by subtracting the brightness of the second non-spot area from the brightness of the first second spot area, the first weight may be less than the second weight.

In an embodiment, the method may further include obtaining second first spot information with respect to a second first spot area on the first substrate, based on the first image data and obtaining second second spot information with respect to a second second spot area on the second substrate, based on the second image data. In such an embodiment, the second first spot information may include a location of the second first spot area, a size of the second first spot area, a shape of the second first spot area, and a brightness of the second first spot area, and the second second spot information may include a location of the second second spot area, a size of the second second spot area, a shape of the second second spot area, and a brightness of the second second spot area.

In an embodiment, the obtaining the synthetic image data may include calculating a third average value which is an average of the brightness of the second first spot area and the brightness of the second second spot area and a second average value which is an average of the brightness of the first non-spot area and the brightness of the second non-spot area, when the location of the first first spot area overlaps the location of the second first spot area, the location of the first second spot area overlaps the location of the second second spot area, the shape of the first first spot area is the same as the shape of the first second spot area, and the shape of the second first spot area is the same as the shape of the second second spot area, and obtaining the synthetic image data including information with respect to a second synthetic spot area corresponding to the second first spot area and having a same brightness as the third average value and information with respect to a synthetic non-spot area corresponding to the first non-spot area and having a same brightness as the second average value.

In an embodiment, the method may further include, between the obtaining the second non-spot information and the obtaining the synthetic image data, correcting a brightness of the first substrate and a brightness of the second substrate in a way such that a center of a brightness graph of the first substrate becomes the same as a center of a brightness graph of the second substrate, when an average value of the brightness of the first substrate is different from an average value of the brightness of the second substrate. In such an embodiment, the obtaining the synthetic image data may include obtaining first first correction spot information corrected from the first first spot information, obtaining first second correction spot information corrected from the first second spot information, obtaining first correction non-spot information corrected from the first non-spot information, obtaining second correction information corrected from the second non-spot information, and obtaining the synthetic image data by using the first first correction spot information, the first second correction spot information, the first correction non-spot information, and the second correction non-spot information.

BRIEF DESCRIPTION OF THE DRAWINGS

The above and other features of certain embodiments of the disclosure will be more apparent from the following description taken in conjunction with the accompanying drawings, in which:

FIG. 6 is a flowchart of an operation of obtaining synthetic image data in a method of inspecting a substrate, according to an embodiment;

FIG. 7 is a flowchart of an operation of obtaining synthetic image data in a method of inspecting a substrate, according to an embodiment;

FIG. 8 is a flowchart of a method of inspecting a substrate, according to an embodiment; and FIG. 9 is a flowchart of a method of inspecting a substrate, according to an embodiment.

DETAILED DESCRIPTION

Figure 1:
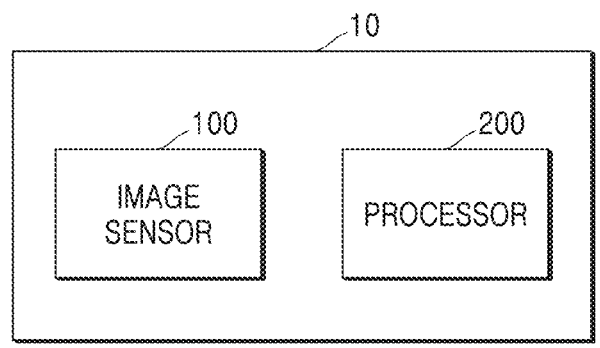
FIG. 1 is a schematic block diagram of a substrate inspection apparatus, according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one selected from a, b and c" and "at least one of a, b or c" indicate only a, only b, only c, both a and b, both a and c, both b and c, all of a, b, and c, or variations thereof. In this specification, the expression "A and/or B" may indicate A, B, or A and B. Also, the expression "at least one selected from A and B" and "at least one of A and B" may indicate A, B, or A and B.

While the disclosure is capable of various modifications and alternative forms, embodiments thereof are shown by way of example in the drawings and will herein be described in detail. Effects and characteristics of the disclosure, and realizing methods thereof will become apparent by referring to the drawings and embodiments described in detail below. However, the disclosure is not limited to the embodiments disclosed hereinafter and may be realized in various forms.

Hereinafter, embodiments of the disclosure will be described in detail by referring to the accompanying drawings. In descriptions with reference to the drawings, the same reference numerals are given to components that are the same or substantially the same as each other and repetitive detailed descriptions thereof may not be repeated.

In embodiments to be described hereinafter, when elements, such as a layer, a film, an area, a plate, etc. are referred to as being "on" another element, the reference may indicate not only a case where the element is "directly on" the other element, but also a case where yet another element is between the element and the other element. Also, for convenience of explanation, elements in the drawings may have exaggerated or reduced sizes. For example, sizes and thicknesses of the elements in the drawings are randomly indicated for convenience of explanation, and thus, the disclosure is not necessarily limited to the illustrations of the drawings.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

As

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
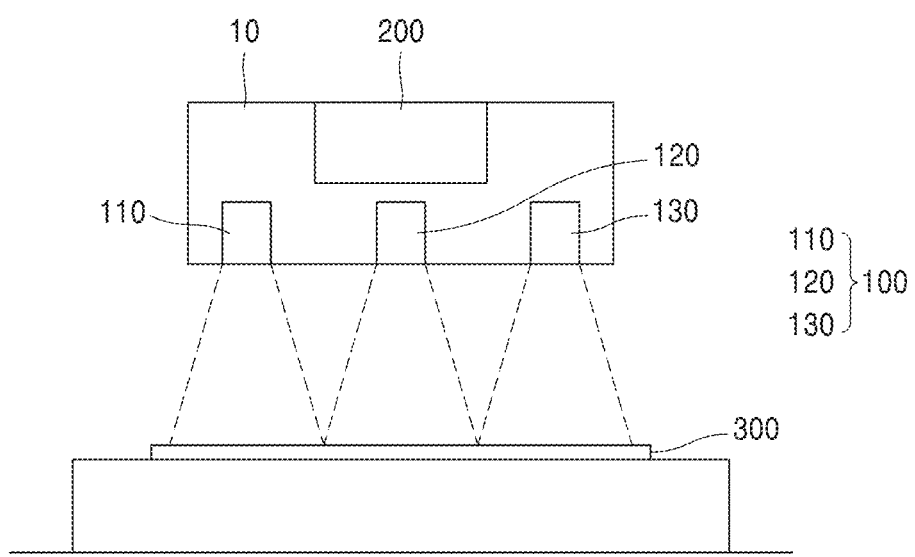
FIG. 2 is a conceptual diagram of a substrate inspection apparatus, according to an embodiment.

FIG. 1 is a schematic block diagram of a substrate inspection apparatus 10 according to an embodiment, and FIG. 2 is a conceptual diagram of the substrate inspection apparatus 10 according to an embodiment.

The substrate inspection apparatus 10 may include any apparatus which may determine a state of a substrate. In an embodiment, the substrate inspection apparatus 10 may be an independent separate device, but one or more embodiments are not limited thereto. In an alternative embodiment, for example, the substrate inspection apparatus 10 may include a device to determine a state of a substrate by being arranged in a device for manufacturing a display apparatus, such as a coating device, an exposure device, a cutting device, or a cleansing device.

A substrate 300 may include various flexible or bendable materials. In an embodiment, the substrate 300 may include glass, metal, or polymer resins. In an embodiment, for example, the substrate 300 may include polymer resins, such as polyethersulphone, polyacrylate, polyetherimide, polyethylene naphthalate, polyethylene terephthalate, polyphenylene sulfide, polyarylate, polyimide, polycarbonate, or cellulose acetate propionate. However, various modifications may be possible. In an embodiment, for example, the substrate 300 may have a multi-layered structure including: two layers each including the polymer resins described above; and a barrier layer between the two layers, the barrier layer including an inorganic material (such as silicon oxide, silicon nitride, silicon oxynitride, or the like).

The substrate 300 may further include one or more layers included in a display apparatus. In an embodiment, for example, the substrate 300 may include at least one of an inorganic insulating layer, an organic layer, and a metal layer included in the display apparatus. In such an embodiment, the substrate 300 may denote a display apparatus which is being manufactured.

The substrate 300 may include a first substrate and a second substrate. The first substrate may be the display apparatus being manufactured, and the second substrate may also be the display apparatus being manufactured. In an embodiment, the first substrate and the second substrate may be the display apparatuses, which are in a manufacturing process, and on which a same process has been conducted. However, one or more embodiments are not limited thereto, and the substrate 300 may include a plurality of substrates, where each of the plurality of substrates 300 may be a display apparatus that is being manufactured after having gone through the same process.

The substrate 300 may include a spot area and a non-spot area. The spot area may be an area in which spots of the substrate 300 are located, and the non-spot area may be an area in which spots of the substrate 300 are not located. A brightness of the substrate 300 in the spot area may be different from a brightness of the substrate 300 in the non-spot area. The brightness of the substrate 300 in the spot area may be uniform, and the brightness of the substrate 300 in the non-spot area may be uniform.

In an embodiment, the first substrate may include a first first spot area (hereinafter, will be referred to as 1-$1^{st}$ spot area) and a first non-spot area (hereinafter, will be referred to as $1^{st}$ non-spot area), and the second substrate may include a first second spot area (hereinafter, will be referred to as $2$-$1^{st}$ spot area) and a second non-spot area (hereinafter, will be referred to as $2^{nd}$ non-spot area). A location of the $1$-$1^{st}$ spot area on the first substrate may correspond to a location of the $2$-$1^{st}$ spot area on the second substrate, and a location of the $1^{st}$ non-spot area on the first substrate may correspond to a location of the $2^{nd}$ non-spot area on the second substrate. The first substrate may further include a second first spot area (hereinafter, will be referred to as $1$-$2^{nd}$ spot area), and the second substrate may further include a second second spot area (hereinafter, will be referred to as $2$-$2^{nd}$ spot area) on a location thereof corresponding to a location of the $1$-$2^{nd}$ spot area on the first substrate.

In an embodiment, as illustrated in FIGS. 1 and 2, the substrate inspection apparatus 10 may include an image sensor 100 and a processor 200. However, FIG. 1 illustrates only components related to one or more embodiments described in this specification. Thus, it is apparent to one of ordinary skill in the art that the substrate inspection apparatus 10 may further include other general-purpose components, in addition to the components illustrated in FIG. 1. In an embodiment, for example, the substrate inspection apparatus 10 may further include a memory (not shown).

Moreover, when an apparatus can achieve the purpose of the disclosure by including only one of the components illustrated in FIG. 1, the apparatus including only one of the components illustrated in FIG. 1 may also correspond to the substrate inspection apparatus 10. In an embodiment, for example, the substrate inspection apparatus 10 may include only the processor 200, and the image sensor 100 may be arranged outside the substrate inspection apparatus 10.

The memory may be hardware storing various data processed in the substrate inspection apparatus 10. In an embodiment, for example, the memory may store data processed or to be processed in the substrate inspection apparatus 10. In an embodiment, the memory may store applications, drivers, etc. to be driven by the substrate inspection apparatus 10.

The memory may include random-access memory (RAM), such as dynamic RAM (DRAM) or static RAM (SRAM), read-only memory (ROM), electrically erasable programmable ROM (EEPROM), compact disk (CD)-ROM, Blu-ray or other optical disk storages, a hard disk drive (HDD), a solid state drive (SSD), or a flash memory. Also, the memory may include other external storage devices which may access the substrate inspection apparatus 10.

Although it is not illustrated in FIGS. 1 and 2, the substrate inspection apparatus 10 may include a light source (not shown). The light source may denote a device configured to radiate light onto a substrate. In an embodiment, for example, the light source may include a light-emitting diode (LED) or a fluorescent lamp for radiating broad light in a visible band, or a laser diode for radiating light of a short wavelength and a great intensity. However, one or more embodiments are not limited thereto. The light source may emit light in a wavelength band appropriate for obtaining first image data with respect to the first substrate or second image data with respect to the second substrate.

The image sensor 100 may denote a device configured to obtain image data with respect to a substrate from the light scattered, emitted, or reflected from the substrate. In an embodiment, for example, the image sensor 100 may obtain the image data with respect to the substrate by measuring the light in the wavelength band of about 300 nm to about 700 nm. However, one or more embodiments are not limited thereto, and the image sensor 100 may measure light in an arbitrary wavelength band that is appropriate for obtaining information with respect to the substrate.

In an embodiment, for example, the image sensor 100 may include a photodiode array, a charge coupled device (CCD) sensor, or a complementary metal oxide semiconductor (CMOS) sensor, which may obtain image data. However, one or more embodiments are not limited thereto. The image sensor 100 may obtain image data including information about an exterior of the substrate, such as a color, a shape, etc. In an embodiment, for example, the image sensor 100 may obtain RGB image data with respect to the substrate.

The image sensor 100 may be a single image sensor which may obtain image data with respect to the substrate 300 by capturing the substrate 300. In an embodiment, for example, the image sensor 100 may obtain first image data with respect to the first substrate from the light scattered, emitted, or reflected from the first substrate and may obtain second image data with respect to the second substrate from the light scattered, emitted, or reflected from the second substrate. However, one or more embodiments are not limited thereto.

In an embodiment, for example, the substrate inspection apparatus 10 may include a plurality of image sensors, each of which is configured to obtain one piece of image data with respect to each substrate 300, from the light scattered, emitted, or reflected from the corresponding substrate 300. In such an embodiment, the image sensor 100 may include an image sensor that may obtain the first image data with respect to the first substrate from the light scattered, emitted, or reflected from the first substrate and another image sensor that may obtain the second image data with respect to the second substrate from the light scattered, emitted, or reflected from the second substrate.

In an embodiment, as illustrated in FIG. 2, the image sensor 100 may include a first image sensor 110, a second image sensor 120, and a third image sensor 130. The first image sensor 110 may obtain image data of a portion at a side of the substrate 300, and the third image sensor 130 may obtain image data of a portion at another side of the substrate 300. The second image sensor 120 may obtain image data of a central portion of the substrate 300. The entire image data of the substrate 300 may be obtained by using the image data obtained by the first image sensor 110, the image data obtained by the second image sensor 120, and the image data obtained by the third image sensor 130.

The processor 200 may perform general functions to control the substrate inspection apparatus 10. In an embodiment, for example, the processor 200 may control an operation of the image sensor 100. The processor 200 may be implemented as an array of a plurality of logic gates or may be implemented as a combination of a general-purpose micro-processor and a memory for storing a program executable in the micro-processor.

The processor 200 may obtain synthetic image data by using the first image data and the second image data. In an embodiment, the synthetic image data may be obtained by using information included in the first image data and information included in the second image data. In an embodiment, for example, the synthetic image data may be obtained by overlapping or merging the first image data with the second image data.

The first image data may be obtained by capturing the first substrate. In an embodiment, as described above, the first substrate may include the $1$-$1^{st}$ spot area and the $1^{st}$ non-spot area, and thus, the first image data may include a first first spot information (hereinafter, will be referred to as 1-1$^{st}$ information) with respect to the 1-1$^{st}$ spot area and a first non-spot information (hereinafter, will be referred to as 1$^{st}$ information) with respect to the 1$^{st}$ non-spot area. The 1-1$^{st}$ information may include a location of the 1-1$^{st}$ spot area, a size of the 1-1$^{st}$ spot area, a shape of the 1-1$^{st}$ spot area, and a brightness of the 1-1$^{st}$ spot area. The 1$^{st}$ information may include a location of the 1$^{st}$ non-spot area and a brightness of the 1$^{st}$ non-spot area. The 1$^{st}$ information may further include a size of the 1$^{st}$ non-spot area and a shape of the 1$^{st}$ non-spot area.

The second image data may be obtained by capturing the second substrate. In an embodiment, as described above, the second substrate may include the 2-1$^{st}$ spot area and the 2$^{nd}$ non-spot area, and thus, the second image data may include a first second spot information (hereinafter, will be referred to as 2-1$^{st}$ information) with respect to the 2-1$^{st}$ spot area and a second non-spot information (hereinafter, will be referred to as 2$^{nd}$ information) with respect to the 2$^{nd}$ non-spot area. The 2-1$^{st}$ information may include a location of the 2-1$^{st}$ spot area, a size of the 2-1$^{st}$ spot area, a shape of the 2-1$^{st}$ spot area, and a brightness of the 2-1$^{st}$ spot area. The 2$^{nd}$ information may include a location of the 2$^{nd}$ non-spot area and a brightness of the 2$^{nd}$ non-spot area. The 2$^{nd}$ information may further include a size of the 2$^{nd}$ non-spot area and a shape of the 2$^{nd}$ non-spot area.

The synthetic image data may be image data with respect to a virtual synthetic substrate. The virtual synthetic substrate may include a first synthetic spot area and a synthetic non-spot area. Thus, the synthetic image data may include information with respect to the first synthetic spot area and information with respect to the synthetic non-spot area. The information with respect to the first synthetic spot area may include a location of the first synthetic spot area, a size of the first synthetic spot area, a shape of the first synthetic spot area, and a brightness of the first synthetic spot area. The information with respect to the synthetic non-spot area may include a location of the synthetic non-spot area, a size of the synthetic non-spot area, a shape of the synthetic non-spot area, and a brightness of the synthetic non-spot area.

The location of the 1-1$^{st}$ spot area on the first substrate may correspond to the location of the 2-1$^{st}$ spot area on the second substrate. The size of the 1-1$^{st}$ spot area may be the same as the size of the 2-1$^{st}$ spot area, and the shape of the 1-1$^{st}$ spot area may be the same as the shape of the 2-1$^{st}$ spot area. In this case, the synthetic substrate may include the first synthetic spot area on a location thereof corresponding to the location of the 1-1$^{st}$ spot area on the first substrate. The size of the first synthetic spot area may be the same as the size of the 1-1$^{st}$ spot area, and the shape of the first synthetic spot area may be the same as the shape of the 1-1$^{st}$ spot area. Moreover, the location of the first synthetic spot area on the synthetic substrate may correspond to the location of the 2-1$^{st}$ spot area on the second substrate, the size of the first synthetic spot area may be the same as the size of the 2-1$^{st}$ spot area, and the shape of the first synthetic spot area may be the same as the shape of the 2-1$^{st}$ spot area. However, the brightness of the 1-1$^{st}$ spot area may be different from the brightness of the 2-1$^{st}$ spot area. The brightness of the first synthetic spot area in this case will be described in detail below.

The location of the 1$^{st}$ non-spot area on the first substrate may be the same as the location of the 2$^{nd}$ non-spot area on the second substrate. The size of the 1$^{st}$ non-spot area may be the same as the size of the 2$^{nd}$ non-spot area, and the shape of the 1$^{st}$ non-spot area may be the same as the shape of the 2$^{nd}$ non-spot area. In this case, the synthetic substrate may include the synthetic non-spot area on a location thereof corresponding to the location of the 1$^{st}$ non-spot area on the first substrate. The size of the synthetic non-spot area may be the same as the size of the 1$^{st}$ non-spot area, and the shape of the synthetic non-spot area may be the same as the shape of the 1$^{st}$ non-spot area. Moreover, the location of the synthetic non-spot area on the synthetic substrate may correspond to the 2$^{nd}$ non-spot area of the second substrate, the size of the synthetic non-spot area may be the same as the size of the 2$^{nd}$ non-spot area, and the shape of the synthetic non-spot area may be the same as the shape of the 2$^{nd}$ non-spot area. However, the brightness of the 1$^{st}$ non-spot area may be different from the brightness of the 2$^{nd}$ non-spot area. The brightness of the synthetic non-spot area in this case will be described in detail below.

According to an embodiment, the processor 200 may calculate a first average value and a second average value. The first average value may be an average of the brightness of the 1-1$^{st}$ spot area and the brightness of the 2-1$^{st}$ spot area, and the second average value may be an average of the brightness of the 1$^{st}$ non-spot area and the 2$^{nd}$ non-spot area. In this case, the brightness of the first synthetic spot area may be the same as the first average value, and the brightness of the synthetic non-spot area may be the same as the second average value. Accordingly, a difference between the brightness of the first synthetic spot area and the brightness of the synthetic non-spot area may be greater than a difference between the brightness of the 1-1$^{st}$ spot area and the brightness of the 1$^{st}$ non-spot area or a difference between the brightness of the 2-1$^{st}$ spot area and the brightness of the 2$^{nd}$ non-spot area.

Hereinafter, for convenience of description, a numeral value of the brightness of each area will be indicated as a relative value, rather than an absolute value. In a case, for example, the brightness of the 1-1$^{st}$ spot area may be 120, the brightness of the 1$^{st}$ non-spot area may be 100, the brightness of the 2-1$^{st}$ spot area may be 122, and the brightness of the 2$^{nd}$ non-spot area may be 98. In this case, the first average value, which is the brightness of the first synthetic spot area, may be 121, the second average value, which is the brightness of the synthetic non-spot area may be 99, and the difference between the brightness of the first synthetic spot area and the brightness of the synthetic non-spot area may be 22. The difference between the brightness of the 1-1$^{st}$ spot area and the brightness of the 1$^{st}$ non-spot area may be 20, and the difference between the brightness of the 2-1$^{st}$ spot area and the brightness of the 2$^{nd}$ non-spot area may be 24. Thus, the difference between the brightness of the first synthetic spot area and the brightness of the synthetic non-spot area may be greater than the difference between the brightness of the 1-1$^{st}$ spot area and the brightness of the 1$^{st}$ non-spot area.

The substrate inspection apparatus 10 may provide the synthetic image data to a user, and the user may determine whether the substrates 300 are defective or not based on the provided synthetic image data. The brightness of the first synthetic spot area in the synthetic image data provided by the substrate inspection apparatus 10 according to the embodiment may be the same as the first average value, and the brightness of the synthetic non-spot area may be the same as the second average value. Thus, the synthetic image data may indicate the difference between the brightness of the first synthetic spot area and the brightness of the synthetic non-spot area that is greater than a difference between the brightness of the spot area and the brightness of the non-spot area shown in actual image data.

Accordingly, in such an embodiment, the user may relatively more easily recognize a spot area. In such an embodiment, even when spots generated in the same location with respect to the plurality of substrates 300 are not detected with the naked eye in each piece of the non-synthesized image data of the substrates 300, the spots may be detected with the naked eye in the synthetic image data. Thus, the user may relatively more easily determine whether or not the substrates 300 are defective, based on the provided synthetic image data. In such an embodiment, the degree of detection of the spots generated in the same location with respect to the plurality of substrates 300 may be increased.

According to an embodiment, the processor 200 may calculate a first normal value and a second normal value. The first normal value may be a normalized value of a sum of the brightness of the 1-$1^{st}$ spot area and the brightness of the 2-$1^{st}$ spot area, and the second normal value may be a normalized value of a sum of the brightness of the $1^{st}$ non-spot area and the brightness of the $2^{nd}$ non-spot area. In an embodiment, the processor 200 may calculate the first normal value and the second normal value by subtracting the same value from each of the sum of the brightness of the 1-$1^{st}$ spot area and the brightness of the 2-$1^{st}$ spot area and the sum of the brightness of the $1^{st}$ non-spot area and the brightness of the $2^{nd}$ non-spot area, such that an average value of the first normal value and the second normal value becomes the same as an average value of the brightness of the first substrate and the brightness of the second substrate.

In such an embodiment, the brightness of the first synthetic spot area may be the same as the first normal value, and the brightness of the synthetic non-spot area may be the same as the second normal value. Accordingly, the difference between the brightness of the first synthetic spot area and the brightness of the synthetic non-spot area may be greater than the difference between the brightness of the 1-$1^{st}$ spot area and the brightness of the $1^{st}$ non-spot area and/or the difference between the brightness of the 2-$1^{st}$ spot area and the brightness of the $2^{nd}$ non-spot area.

Hereinafter, for convenience of description, a numeral value of the brightness of each area is indicated as a relative value, rather than an absolute value. In a case, for example, the brightness of the $1^{st}$ non-spot area may be 100, the brightness of the 1-$1^{st}$ spot area may be 120, the brightness of the $2^{nd}$ non-spot area may be 98, and the brightness of the 2-$1^{st}$ spot area may be 122. Also, hereinafter, for convenience of description, the brightness of the first substrate is calculated as an average of the brightness of the 1-$1^{st}$ spot area and the $1^{st}$ non-spot area, and the brightness of the second substrate is calculated as an average of the brightness of the 2-$1^{st}$ spot area and the $2^{nd}$ non-spot area. In a case, for example, the brightness of the first substrate may be 110, and the brightness of the second substrate may be 110. However, one or more embodiments are not limited thereto, and the brightness of each substrate may vary according to sizes of the spot area and the non-spot area.

The average value of the brightness of the first substrate and the brightness of the second substrate may be 110. The sum of the brightness of the 1-$1^{st}$ spot area and the brightness of the 2-$1^{st}$ spot area may be 242, and the sum of the brightness of the $1^{st}$ non-spot area and the brightness of the $2^{nd}$ non-spot area may be 198. The value obtained by subtracting 110 (i.e., the average value of the brightness of the first substrate and the brightness of the second substrate) from the sum of the brightness of the 1-$1^{st}$ spot area and the brightness of the 2-$1^{st}$ spot area may be 132, and the value obtained by subtracting 110 (i.e., the average value of the brightness of the first substrate and the brightness of the second substrate) from the sum of the brightness of the $1^{st}$ non-spot area and the brightness of the $2^{nd}$ non-spot area may be 88. The average of 132 and 88 is 110, and thus, this may become the same as the average value of the brightness of the first substrate and the brightness of the second substrate. Accordingly, the first normal value may be 132, the second normal value may be 88, and the difference between the brightness of the first synthetic spot area and the brightness of the synthetic non-spot area may be 44. The difference between the brightness of the 1-$1^{st}$ spot area and the brightness of the $1^{st}$ non-spot area may be 20, and the difference between the brightness of the 2-$1^{st}$ spot area and the brightness of the $2^{nd}$ non-spot area may be 24. Thus, the difference between the brightness of the first synthetic spot area and the brightness of the synthetic non-spot area may be greater than the difference between the brightness of the 1-$1^{st}$ spot area and the brightness of the $1^{st}$ non-spot area and may be greater than the difference between the brightness of the 2-$1^{st}$ spot area and the brightness of the $2^{nd}$ non-spot area.

The brightness of the first synthetic spot area in the synthetic image data provided by the substrate inspection apparatus 10 according to the embodiment may be the same as the first normal value, and the brightness of the synthetic non-spot area may be the same as the second normal value. The synthetic image data may indicate the difference between the brightness of the first synthetic spot area and the brightness of the synthetic non-spot area that is greater than the difference between the brightness of the spot area and the brightness of the non-spot area shown in the actual image data. In such an embodiment, even when spots generated in the same location with respect to the plurality of substrates 300 are not detected with the naked eye in each piece of the non-synthesized image data of the substrates 300, the spots may be detected with the naked eye in the synthetic image data. Thus, in such an embodiment, the degree of detection of the spots generated in the same location with respect to the plurality of substrates 300 may be increased.

According to an embodiment, the processor 200 may calculate a first correction value and a second correction value. The first correction value may be a sum of a value obtained by multiplying the brightness of the 1-$1^{st}$ spot area by a first weight and a value obtained by multiplying the brightness of the 2-$1^{st}$ spot area by a second weight, and the second correction value may be a sum of a value obtained by multiplying the brightness of the $1^{st}$ non-spot area by the first weight and a value obtained by multiplying the brightness of the $2^{nd}$ non-spot area by the second weight.

The second weight may be different from the first weight. In an embodiment, for example, when a value obtained by subtracting the brightness of the $1^{st}$ non-spot area from the brightness of the 1-$1^{st}$ spot area is less than a value obtained by subtracting the brightness of the $2^{nd}$ non-spot area from the brightness of the 2-$1^{st}$ spot area, the first weight may be less than the second weight. As a value obtained by subtracting a brightness of the non-spot area from a brightness of the spot area decreases, the visibility of the corresponding spot area for a user may be reduced. Accordingly, numeral values related to the 1-$1^{st}$ spot area having a low visibility, for example, the brightness of the 1-$1^{st}$ spot area and the brightness of the $1^{st}$ non-spot area, may be multiplied by a low weight, and numeral values related to the 2-$1^{st}$ spot area having a high visibility, for example, the brightness of the 2-$1^{st}$ spot area and the brightness of the $2^{nd}$ non-spot area, may be multiplied by a high weight. However, one or more embodiments are not limited thereto.

In a case, the brightness of the first synthetic spot area may be the same as the first correction value, and the brightness of the synthetic non-spot area may be the same as the second correction value. Accordingly, the difference between the brightness of the first synthetic spot area and the brightness of the synthetic non-spot area may be greater than the difference between the brightness of the $1\text{-}1^{st}$ spot area and the brightness of the $1^{st}$ non-spot area or the difference between the brightness of the $2\text{-}1^{st}$ spot area and the brightness of the $2^{nd}$ non-spot area.

Hereinafter, for convenience of description, a numeral value of the brightness of each area is indicated as a relative value, rather than an absolute value. In a case, for example, the brightness of the $1\text{-}1^{st}$ spot area may be 120, the brightness of the $1^{st}$ non-spot area may be 100, the brightness of the $2\text{-}1^{st}$ spot area may be 122, and the brightness of the $2^{nd}$ non-spot area may be 98. In this case, a value obtained by subtracting the brightness of the $1^{st}$ non-spot area from the brightness of the $1\text{-}1^{st}$ spot area may be 20, and a value obtained by subtracting the brightness of the $2^{nd}$ non-spot area from the brightness of the $2\text{-}1^{st}$ spot area may be 24. Because the value obtained by subtracting the brightness of the $1^{st}$ non-spot area from the brightness of the $1\text{-}1^{st}$ spot area is less than the value obtained by subtracting the brightness of the $2^{nd}$ non-spot area from the brightness of the $2\text{-}1^{st}$ spot area, the first weight may be less than the second weight. Hereinafter, for convenience of description, a case where the first weight may be 0.25, and the second weight may be 0.75 will be described in detail. However, one or more embodiments are not limited thereto.

In this case, the first correction value, which is the brightness of the first synthetic area, may be 121.5, the second correction value, which is the brightness of the synthetic non-spot area may be 98.5, and the difference between the brightness of the first synthetic spot area and the brightness of the synthetic non-spot area may be 23. The difference between the brightness of the $1\text{-}1^{st}$ spot area and the brightness of the $1^{st}$ non-spot area may be 20, and the difference between the brightness of the $2\text{-}1^{st}$ spot area and the brightness of the $2^{nd}$ non-spot area may be 24. Thus, the difference between the brightness of the first synthetic spot area and the brightness of the synthetic non-spot area may be greater than the difference between the brightness of the $1\text{-}1^{st}$ spot area and the brightness of the $1^{st}$ non-spot area.

The brightness of the first synthetic spot area in the synthetic image data provided by the substrate inspection apparatus 10 according to the embodiment may be the same as the first correction value, and the brightness of the synthetic non-spot area may be the same as the second correction value. The synthetic image data may indicate the difference between the brightness of the first synthetic spot area and the brightness of the synthetic non-spot area that is greater than the difference between the brightness of the spot area and the brightness of the non-spot area shown in the actual image data. Therefore, in such an embodiment, even when spots generated in the same location with respect to the plurality of substrates 300 are not detected with the naked eye in each piece of the non-synthesized image data of the substrates 300, the spots may be detected with the naked eye in the synthetic image data. Thus, in such an embodiment, the degree of detection of the spots generated in the same location with respect to the plurality of substrates 300 may be increased.

In an embodiment, as described above, the first substrate may further include the $1\text{-}2^{nd}$ spot area, and the second substrate may further include the $2\text{-}2^{nd}$ spot area. In such an embodiment, the processor 200 may obtain a second first spot information (hereinafter, will be referred to as $1\text{-}2^{nd}$ information) with respect to the $1\text{-}2^{nd}$ spot area on the first substrate, based on the first image data. The $1\text{-}2^{nd}$ information may include a location of the $1\text{-}2^{nd}$ spot area, a size of the $1\text{-}2^{nd}$ spot area, a shape of the $1\text{-}2^{nd}$ spot area, and a brightness of the $1\text{-}2^{nd}$ spot area. Also, the processor 200 may obtain a second second spot information (hereinafter, will be referred to as $2\text{-}2^{nd}$ information) with respect to the $2\text{-}2^{nd}$ spot area on the second substrate, based on the second image data. The $2\text{-}2^{nd}$ information may include a location of the $2\text{-}2^{nd}$ spot area, a size of the $2\text{-}2^{nd}$ spot area, a shape of the $2\text{-}2^{nd}$ spot area, and a brightness of the $2\text{-}2^{nd}$ spot area.

The location of the $1\text{-}2^{nd}$ spot area may overlap the location of the $1\text{-}1^{st}$ spot area, and the location of the $2\text{-}2^{nd}$ spot area may overlap the location of the $2\text{-}1^{st}$ spot area. The location of the $1\text{-}1^{st}$ spot area on the first substrate may correspond to the location of the $2\text{-}1^{st}$ spot area on the second substrate, and thus, the location of the $1\text{-}2^{nd}$ spot area may correspond to the location of the $2\text{-}1^{st}$ spot area, and the location of the $2\text{-}2^{nd}$ spot area may correspond to the location of the $1\text{-}1^{st}$ spot area.

The size of the $1\text{-}2^{nd}$ spot area may be the same as the size of the $2\text{-}2^{nd}$ spot area, and the shape of the $1\text{-}2^{nd}$ spot area may be the same as the shape of the $2\text{-}2^{nd}$ spot area. That is, the $1\text{-}2^{nd}$ spot area and the $2\text{-}2^{nd}$ spot area may be the spot areas generated due to a same factor. The size of the $1\text{-}1^{st}$ spot area may be the same as the size of the $2\text{-}1^{st}$ spot area, and the shape of the $1\text{-}1^{st}$ spot area may be the same as the shape of the $2\text{-}1^{st}$ spot area. That is, the $1\text{-}1^{st}$ spot area and the $2\text{-}1^{st}$ spot area may be the spot areas generated due to the same factor. However, the size of the $1\text{-}2^{nd}$ spot area may be different from the size of the $1\text{-}1^{st}$ spot area, or the shape of the $1\text{-}2^{nd}$ spot area may be different from the shape of the $1\text{-}1^{st}$ spot area. Also, the size of the $2\text{-}2^{nd}$ spot area may be different from the size of the $2\text{-}1^{st}$ spot area, or the shape of the $2\text{-}2^{nd}$ spot area may be different from the shape of the $2\text{-}1^{st}$ spot area. That is, a generation factor of the $1\text{-}2^{nd}$ spot area and the $2\text{-}2^{nd}$ spot area may be different from a generation factor of the $1\text{-}1^{st}$ spot area and the $2\text{-}1^{st}$ spot area.

In this case, the processor 200 may calculate a third average value. The third average value may be an average of the brightness of the $1\text{-}2^{nd}$ spot area and the brightness of the $2\text{-}2^{nd}$ spot area. The third average value may be a brightness of a second synthetic spot area. The virtual synthetic substrate may further include the second synthetic spot area, and the synthetic image data may include information with respect to the second synthetic spot area. The information with respect to the second synthetic spot area may include a location of the second synthetic spot area, a size of the second synthetic spot area, a shape of the second synthetic spot area, and a brightness of the second synthetic spot area.

In an embodiment, even when the location of the $1\text{-}2^{nd}$ spot area corresponds to the location of the $2\text{-}1^{st}$ spot area, and the location of the $2\text{-}2^{nd}$ spot area corresponds to the location of the $1\text{-}1^{st}$ spot area, the brightness of second synthetic spot area may be calculated by using the brightness of the $1\text{-}2^{nd}$ spot area and the brightness of the $2\text{-}2^{nd}$ spot area, and the brightness of the first synthetic spot area may be calculated by using the brightness of the $1\text{-}1^{st}$ spot area and the brightness of the $2\text{-}1^{st}$ spot area, in a case where the $1\text{-}2^{nd}$ spot area and the $2\text{-}2^{nd}$ spot area are generated due to a same factor and the $1\text{-}1^{st}$ spot area and the $2\text{-}1^{st}$ spot area are generated due to the same factor. Accordingly, the substrate inspection apparatus 10 according to the embodiment may increase the accuracy of the detection of defects and may detect all defects without missing any of the defects.

According to an embodiment, when the average value of the brightness of the first substrate is different from the average value of the brightness of the second substrate, the processor 200 may correct the brightness of the first substrate and the brightness of the second substrate in a way such that a center of a brightness graph of the first substrate is the same as a center of a brightness graph of the second substrate.

In this specification, "the brightness graph of the first substrate" may denote a graph indicating the brightness of portions of the first substrate on a predetermined location thereof, "the center of the brightness graph of the first substrate" may denote the most frequent brightness value from among the brightness values of the portions of the first substrate on the predetermined location thereof, and "the average value of the brightness of the first substrate" may denote the average of the brightness values of the portions of the first substrate on the predetermined location thereof. "The brightness graph of the second substrate" may denote a graph indicating the brightness of portions of the second substrate on a predetermined location thereof, "the center of the brightness graph of the second substrate" may denote the most frequent brightness value from among the brightness values of the portions of the second substrate on the predetermined location thereof, and "the average value of the brightness of the second substrate" may denote the average of the brightness values of the portions of the second substrate on the predetermined location thereof.

Figure 3:
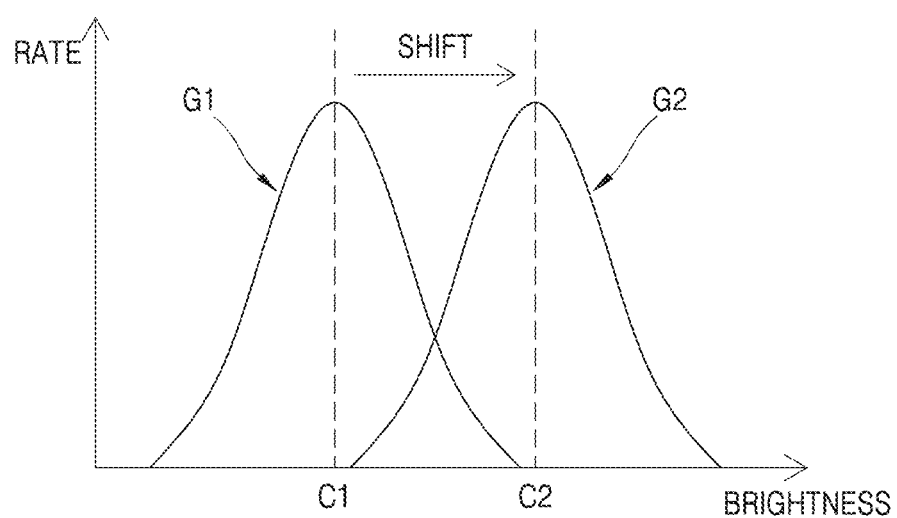
FIG. 3 is a diagram for describing correction of brightness of a substrate, according to an embodiment.

As illustrated in FIG. 3 for describing correction of brightness of the substrate, according to an embodiment, when the average value of the brightness of the first substrate is different from the average value of the brightness of the second substrate, a brightness graph G1 of the first substrate may be shifted in a direction of a brightness graph G2 of the second substrate, such that a center C1 of the brightness graph G1 of the first substrate becomes the same as a center C2 of the brightness graph G2 of the second substrate. FIG. 3 illustrates that the brightness graph G1 of the first substrate is shifted in the direction of the brightness graph G2 of the second substrate. However, one or more embodiments are not limited thereto. In an embodiment, for example, the brightness graph G2 of the second substrate may be shifted in a direction of the brightness graph G1 of the first substrate, and together with the shifting of the brightness graph G1 of the first substrate in the direction of the brightness graph G2 of the second substrate, the brightness graph G2 of the second substrate may be shifted in the direction of the brightness graph G1 of the first substrate.

Accordingly, in such an embodiment, the processor 200 may obtain a first first correction spot information (hereinafter, will be referred to as $1\text{-}1^{st}$ correction information) corrected from the $1\text{-}1^{st}$ information, a first second correction stop information (hereinafter, will be referred to as $2\text{-}1^{st}$ correction information) corrected from the $2\text{-}1^{st}$ information, a first correction non-spot information (hereinafter, will be referred to as $1^{st}$ correction information) corrected from the $1^{st}$ information, and a second correction non-spot information (hereinafter, will be referred to as $2^{nd}$ correction information) corrected from the $2^{nd}$ information. In such an embodiment, the brightness of the $1\text{-}1^{st}$ spot area, the brightness of the $2\text{-}1^{st}$ spot area, the brightness of the $1^{st}$ non-spot area, and the brightness of the $2^{nd}$ non-spot area may be corrected. The processor 200 may obtain the synthetic image data by using the corrected brightness of the $1\text{-}1^{st}$ spot area, the corrected brightness of the $2\text{-}1^{st}$ spot area, the corrected brightness of the $1^{st}$ non-spot area, and the corrected brightness of the $2^{nd}$ non-spot area.

In a case where the average value of the brightness of the first substrate is different from the average value of the brightness of the second substrate, during the synthetic image data obtainment, a substrate having a greater average value of the brightness may affect more the synthetic image data, or a substrate having a less average value of the brightness may affect more the synthetic image data. In this case, a weight may be assigned to an unintended substrate. However, according to an embodiment, the brightness of the first substrate and the brightness of the second substrate may be corrected in a way such that the center of the brightness graph of the first substrate and the center of the brightness graph of the second substrate may become the same as each other. Thus, the accuracy of the synthetic image data may be increased without assigning a weight to an unintended substrate.

Figure 4:
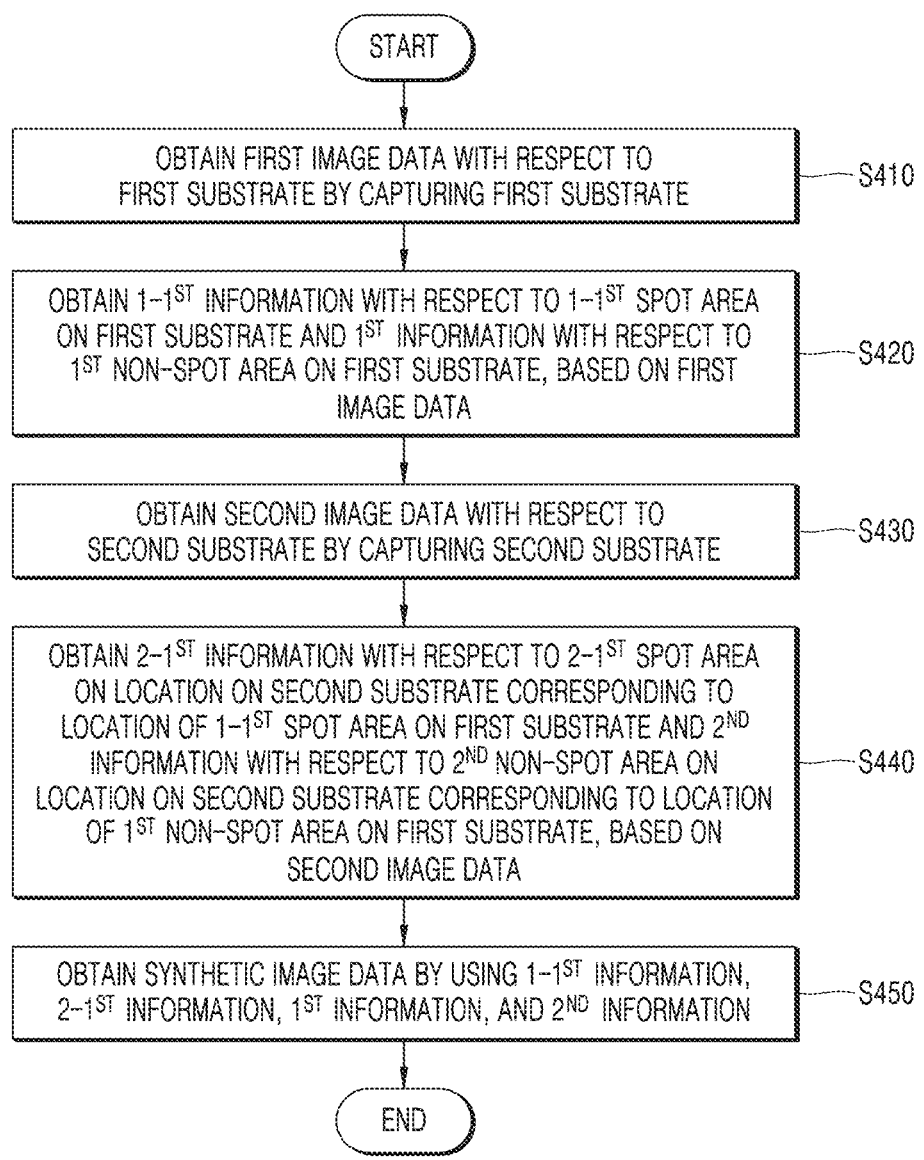
FIG. 4 is a flowchart of a method of inspecting a substrate, according to an embodiment.

FIG. 4 is a flowchart of a method of inspecting a substrate, according to an embodiment. As illustrated in FIG. 4, the method of inspecting a substrate, according to an embodiment, may include the operations sequentially processed by the substrate inspection apparatus 10 illustrated in FIGS. 1 and 2. Thus, the same or like features described above with reference to FIGS. 1 through 3 may be applied to the method of inspecting a substrate, described with reference to FIGS. 4 through 9, and any repetitive detailed description thereof may be omitted or simplified.

In operation S410, the substrate inspection apparatus 10 may obtain the first image data with respect to the first substrate by capturing the first substrate. The first substrate may include the $1\text{-}1^{st}$ spot area and the $1^{st}$ non-spot area, and thus, the first image data may include the $1\text{-}1^{st}$ information with respect to the $1\text{-}1^{st}$ spot area and the $1^{st}$ information with respect to the $1^{st}$ non-spot area.

In operation S420, the substrate inspection apparatus 10 may obtain the $1\text{-}1^{st}$ information with respect to the $1\text{-}1^{st}$ spot area on the first substrate and the $1^{st}$ information with respect to the $1^{st}$ non-spot area on the first substrate, based on the first image data. The $1\text{-}1^{st}$ information may include the location of the $1\text{-}1^{st}$ spot area, the size of the $1\text{-}1^{st}$ spot area, the shape of the $1\text{-}1^{st}$ spot area, and the brightness of the $1\text{-}1^{st}$ spot area. The $1^{st}$ information may include the location of the $1^{st}$ non-spot area and the brightness of the $1^{st}$ non-spot area. The $1^{st}$ information may further include the size of the $1^{st}$ non-spot area and the shape of the $1^{st}$ non-spot area.

In operation S430, the substrate inspection apparatus 10 may obtain the second image data with respect to the second substrate by capturing the second substrate. The second substrate may include the $2\text{-}1^{st}$ spot area and the $2^{nd}$ non-spot area, and thus, the second image data may include the $2\text{-}1^{st}$ information with respect to the $2\text{-}1^{st}$ spot area and the $2^{nd}$ information with respect to the $2^{nd}$ non-spot area.

In operation S440, based on the second image data, the substrate inspection apparatus 10 may obtain the $2\text{-}1^{st}$ information with respect to the $2\text{-}1^{st}$ spot area on the second substrate on the location thereof corresponding to the location of the $1\text{-}1^{st}$ spot area on the first substrate and the $2^{nd}$ information with respect to the $2^{nd}$ non-spot area on the second substrate on the location thereof corresponding to the location of the $1^{st}$ non-spot area on the first substrate. The $2\text{-}1^{st}$ information may include the location of the $2\text{-}1^{st}$ spot area, the size of the $2\text{-}1^{st}$ spot area, the shape of the $2\text{-}1^{st}$ spot area, and the brightness of the $2\text{-}1^{st}$ spot area. The $2^{nd}$ information may include the location of the $2^{nd}$ non-spot area and the brightness of the $2^{nd}$ non-spot area. The $2^{nd}$ information may further include the size of the $2^{nd}$ non-spot area and the shape of the $2^{nd}$ non-spot area.

In operation S450, the substrate inspection apparatus 10 may obtain the synthetic image data by using the 1-1$^{st}$ information, the 2-1$^{st}$ information, the 1$^{st}$ information, and the 2$^{nd}$ information. The synthetic image data may be the image data with respect to the virtual synthetic substrate. The virtual synthetic substrate may include the first synthetic spot area and the synthetic non-spot area. The synthetic image data may include the information with respect to the first synthetic spot area and the information with respect to the synthetic non-spot area. The information with respect to the first synthetic spot area may include the location of the first synthetic spot area, the size of the first synthetic spot area, the shape of the first synthetic spot area, and the brightness of the first synthetic spot area. The information with respect to the synthetic non-spot area may include the location of the synthetic non-spot area, the size of the synthetic non-spot area, the shape of the synthetic non-spot area, and the brightness of the synthetic non-spot area.

The synthetic substrate may include the first synthetic spot area on the location thereof corresponding to the location of the 1-1$^{st}$ spot area on the first substrate. The size of the first synthetic spot area may be the same as the size of the 1-1$^{st}$ spot area, and the shape of the first synthetic spot area may be the same as the shape of the 1-1$^{st}$ spot area. Moreover, the location of the first synthetic spot area on the synthetic substrate may correspond to the location of the 2-1$^{st}$ spot area on the second substrate, the size of the first synthetic spot area may be the same as the size of the 2-1$^{st}$ spot area, and the shape of the first synthetic spot area may be the same as the shape of the 2-1$^{st}$ spot area.

The synthetic substrate may include the synthetic non-spot area on the location thereof corresponding to the location of the 1$^{st}$ non-spot area on the first substrate. The size of the synthetic non-spot area may be the same as the size of the 1$^{st}$ non-spot area, and the shape of the synthetic non-spot area may be the same as the shape of the 1$^{st}$ non-spot area. Moreover, the location of the synthetic non-spot area on the synthetic substrate may correspond to the location of the 2$^{nd}$ non-spot area on the second substrate, the size of the synthetic non-spot area may be the same as the size of the 2$^{nd}$ non-spot area, and the shape of the synthetic non-spot area may be the same as the shape of the 2$^{nd}$ non-spot area.

Figure 5:
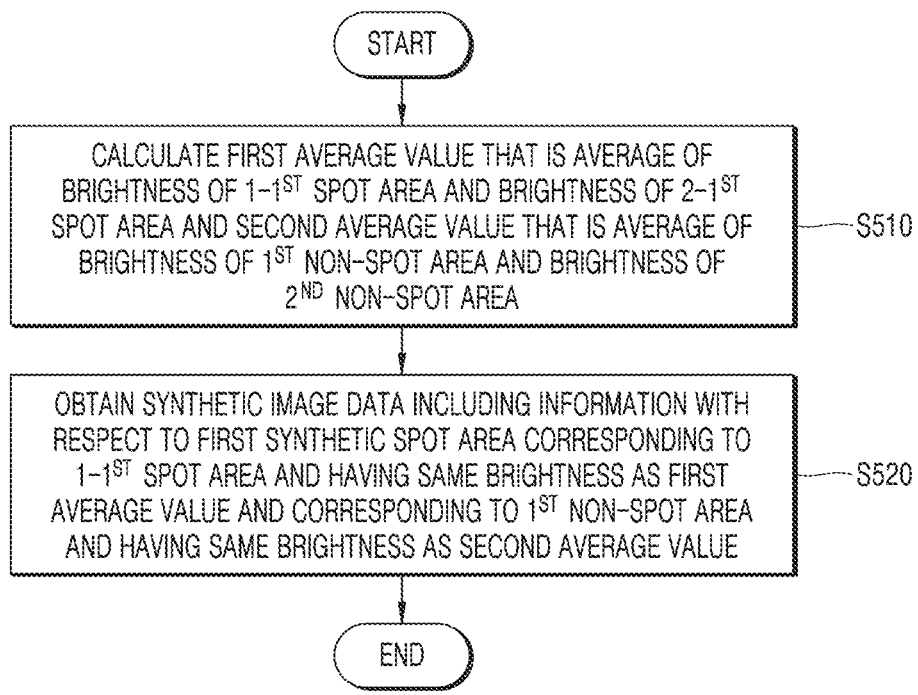
FIG. 5 is a flowchart of an operation of obtaining synthetic image data in a method of inspecting a substrate, according to an embodiment.

FIG. 5 is a flowchart of an operation of obtaining the synthetic image data in the method of inspecting a substrate, according to an embodiment.

As illustrated in FIG. 5, in operation S510, the substrate inspection apparatus 10 may calculate the first average value which is the average of the brightness of the 1-1$^{st}$ spot area and the brightness of the 2-1$^{st}$ spot area and the second average value which is the average of the brightness of the 1$^{st}$ non-spot area and the brightness of the 2$^{nd}$ non-spot area.

In operation S520, the substrate inspection apparatus 10 may obtain the synthetic image data including: information with respect to the first synthetic spot area corresponding to the 1-1$^{st}$ spot area and having a same brightness as the first average value; and information with respect to the synthetic non-spot area corresponding to the 1$^{st}$ non-spot area and having a same brightness as the second average value.

A difference between the brightness of the first synthetic spot area and the brightness of the synthetic non-spot area may be greater than a difference between the brightness of the 1-1$^{st}$ spot area and the brightness of the 1$^{st}$ non-spot area or a difference between the brightness of the 2-1$^{st}$ spot area and the brightness of the 2$^{nd}$ non-spot area. The substrate inspection apparatus 10 may provide the synthetic image data to a user, and the user may determine whether the substrates 300 are defective or not based on the provided synthetic image data. The synthetic image data may indicate the difference between the brightness of the first synthetic spot area and the brightness of the synthetic non-spot area that is greater than the difference between the brightness of the spot area and the brightness of the non-spot area shown in the actual image data.

Accordingly, even when spots generated in a same location with respect to the plurality of substrates 300 are not detected with the naked eye in each piece of the non-synthesized image data of the substrates 300, the spots may be detected with the naked eye in the synthetic image data. Thus, the degree of detection of the spots generated in the same location with respect to the plurality of substrates 300 may be increased.

FIG. 6 is a flowchart of an operation of obtaining the synthetic image data in the method of inspecting a substrate, according to an embodiment.

As illustrated in FIG. 6, in operation S610, the substrate inspection apparatus 10 may calculate the first normal value which is obtained by normalizing the sum of the brightness of the 1-1$^{st}$ spot area and the brightness of the 2-1$^{st}$ spot area and the second normal value which is obtained by normalizing the sum of the brightness of the 1$^{st}$ non-spot area and the brightness of the 2$^{nd}$ non-spot area. In an embodiment, for example, the substrate inspection apparatus 10 may calculate the first normal value and the second normal value by subtracting a same value from each of the sum of the brightness of the 1-1$^{st}$ spot area and the brightness of the 2-1$^{st}$ spot area and the sum of the brightness of the 1$^{st}$ non-spot area and the brightness of the 2$^{nd}$ non-spot area, so that an average value of the first normal value and the second normal value becomes the same as an average value of the brightness of the first substrate and the brightness of the second substrate.

In operation S620, the substrate inspection apparatus 10 may obtain the synthetic image data including: the information with respect to the first synthetic spot area corresponding to the 1-1$^{st}$ spot area and having the same brightness as the first normal value; and information with respect to the synthetic non-spot area corresponding to the 1$^{st}$ non-spot area and having the same brightness as the second normal value. A difference between the brightness of the first synthetic spot area and the brightness of the synthetic non-spot area may be greater than a difference between the brightness of the 1-1$^{st}$ spot area and the brightness of the 1$^{st}$ non-spot area and/or a difference between the brightness of the 2-1$^{st}$ spot area and the brightness of the 2$^{nd}$ non-spot area. The substrate inspection apparatus 10 may provide the synthetic image data to a user, and the user may determine whether the substrates 300 are defective or not based on the provided synthetic image data. The synthetic image data may indicate the difference between the brightness of the first synthetic spot area and the brightness of the synthetic non-spot area that is greater than the difference between the brightness of the spot area and the brightness of the non-spot area shown in the actual image data.

Therefore, even when spots generated in the same location with respect to the plurality of substrates 300 are not detected with the naked eye in each piece of the non-synthesized image data of the substrates 300, the spots may be detected with the naked eye in the synthetic image data. Thus, the degree of detection of the spots generated in the same location with respect to the plurality of substrates 300 may be increased.

FIG. 7 is a flowchart of an operation of obtaining the synthetic image data in the method of inspecting a substrate, according to an embodiment.

As illustrated in FIG. 7, in operation S710, the substrate inspection apparatus 10 may calculate the first correction value, which is the sum of a value obtained by multiplying the brightness of the 1-1$^{st}$ spot area by a first weight and a value obtained by multiplying the brightness of the 2-1$^{st}$ spot area by a second weight that is different from the first weight, and the second correction value, which is the sum of a value obtained by multiplying the brightness of the 1$^{st}$ non-spot area by the first weight and a value obtained by multiplying the brightness of the 2$^{nd}$ non-spot area by the second weight. In an embodiment, for example, when a value obtained by subtracting the brightness of the 1$^{st}$ non-spot area from the brightness of the 1-1$^{st}$ spot area is less than a value obtained by subtracting the brightness of the 2$^{nd}$ non-spot area from the brightness of the 2-1$^{st}$ spot area, the first weight may be less than the second weight.

In operation S720, the synthetic image data including the information with respect to the first synthetic spot area corresponding to the 1-1$^{st}$ spot area and having the same brightness as the first correction value and the information with respect to the synthetic non-spot area corresponding to the 1$^{st}$ non-spot area and having the same brightness as the second correction value may be obtained. A difference between the brightness of the first synthetic spot area and the brightness of the synthetic non-spot area may be greater than a difference between the brightness of the 1-1$^{st}$ spot area and the brightness of the 1$^{st}$ non-spot area or a difference between the brightness of the 2-1$^{st}$ spot area and the brightness of the 2$^{nd}$ non-spot area. The substrate inspection apparatus 10 may provide the synthetic image data to a user, and the user may determine whether the substrates 300 are defective or not based on the provided synthetic image data. The synthetic image data may indicate the difference between the brightness of the first synthetic spot area and the brightness of the synthetic non-spot area that is greater than the difference between the brightness of the spot area and the brightness of the non-spot area shown in the actual image data.

Therefore, even when spots generated in the same location with respect to the plurality of substrates 300 are not detected with the naked eye in each piece of the non-synthesized image data of the substrates 300, the spots may be detected with the naked eye in the synthetic image data. Thus, the degree of detection of the spots generated in the same location with respect to the plurality of substrates 300 may be increased.

FIG. 8 is a flowchart of the method of inspecting a substrate, according to an embodiment.

In operation S810, the substrate inspection apparatus 10 may obtain the first image data with respect to the first substrate by capturing the first substrate, and in operation S820, the substrate inspection apparatus 10 may obtain the 1-1$^{st}$ information with respect to the 1-1$^{st}$ spot area on the first substrate and the 1$^{st}$ information with respect to the 1$^{st}$ non-spot area on the first substrate, based on the first image data. Operations S810 and S820 may correspond to operations S410 and S420 described above with reference to FIG. 4, respectively, and thus, any repetitive detailed descriptions thereof will be omitted.

In operation S825, the substrate inspection apparatus 10 may obtain the 1-2$^{nd}$ information with respect to the 1-2$^{nd}$ spot area on the first substrate, based on the first image data. The 1-2$^{nd}$ information may include the location of the 1-2$^{nd}$ spot area, the size of the 1-2$^{nd}$ spot area, the shape of the 1-2$^{nd}$ spot area, and the brightness of the 1-2$^{nd}$ spot area. FIG. 8 illustrates an embodiment where operations S820 and S825 are separately performed. However, one or more embodiments are not limited thereto. In an alternative embodiment, for example, the obtaining of the 1-1$^{st}$ information and the 1$^{st}$ information may be simultaneously performed with the obtaining of the 1-2$^{nd}$ information.

In operation S830, the substrate inspection apparatus 10 may obtain the second image data with respect to the second substrate by capturing the second substrate, and in operation S840, based on the second image data, the substrate inspection apparatus 10 may obtain the 2-1$^{st}$ information with respect to the 2-1$^{st}$ spot area on the second substrate on the location thereof corresponding to the location of the 1-1$^{st}$ spot area on the first substrate and the 2$^{nd}$ information with respect to the 2$^{nd}$ non-spot area on the second substrate on the location thereof corresponding to the location of the 1$^{st}$ non-spot area on the first substrate. Operations S830 and S840 may correspond to operations S430 and S430 described above with reference to FIG. 4, respectively, and thus, any repetitive detailed descriptions thereof will be omitted.

In operation S845, the substrate inspection apparatus 10 may obtain the 2-2$^{nd}$ information with respect to the 2-2$^{nd}$ spot area on the second substrate, based on the second image data. The 2-2$^{nd}$ information may include the location of the 2-2$^{nd}$ spot area, the size of the 2-2$^{nd}$ spot area, the shape of the 2-2$^{nd}$ spot area, and the brightness of the 2-2$^{nd}$ spot area. FIG. 8 illustrates an embodiment where operations S840 and S845 are separately performed. However, one or more embodiments are not limited thereto. In an alternative embodiment, for example, the obtaining of the 2-1$^{st}$ information and the 2$^{nd}$ information may be simultaneously performed with the obtaining of the 2-2$^{nd}$ information.

In operations S850, the substrate inspection apparatus 10 may determine whether or not the location of the 1-1$^{st}$ spot area overlaps the location of the 1-2$^{nd}$ spot area, the location of the 2-1$^{st}$ spot area overlaps the location of the 2-2$^{nd}$ spot area, and the shape of the 1-2$^{nd}$ spot area is the same as the shape of the 2-2$^{nd}$ spot area.

In operation S855, when the location of the 1-1$^{st}$ spot area overlaps the location of the 1-2$^{nd}$ spot area, the location of the 2-1$^{st}$ spot area overlaps the location of the 2-2$^{nd}$ spot area, and the shape of the 1-2$^{nd}$ spot area is the same as the shape of the 2-2$^{nd}$ spot area, the substrate inspection apparatus 10 may calculate the third average value which is an average of the brightness of the 1-2$^{nd}$ spot area and the brightness of the 2-2$^{nd}$ spot area and the second average value which is an average of the brightness of the 1$^{st}$ non-spot area and the brightness of the 2$^{nd}$ non-spot area. That is, the 1-2$^{nd}$ spot area and the 2-2$^{nd}$ spot area may be the spot areas generated due to a same factor. However, the generation factor of the 1-2$^{nd}$ spot area and the 2-2$^{nd}$ spot area may be different from a generation factor of the 1-1$^{st}$ spot area and the 2-1$^{st}$ spot area.

In operation S860, the substrate inspection apparatus 10 may obtain the synthetic image data including the information with respect to the second synthetic spot area corresponding to the 1-2$^{nd}$ spot area and having the same brightness as the third average value and the information with respect to the synthetic non-spot area corresponding to the 1$^{st}$ non-spot area and having the same brightness as the second average value. As described above, the virtual synthetic substrate may further include the second synthetic spot area, and the synthetic image data may include the information with respect to the second synthetic spot area. The information with respect to the second synthetic spot area may include the location of the second synthetic spot area, the size of the second synthetic spot area, the shape of the second synthetic spot area, and the brightness of the second synthetic spot area.

Even when the location of the $1\text{-}2^{nd}$ spot area corresponds to the location of the $2\text{-}1^{st}$ spot area, and the location of the $2\text{-}2^{nd}$ spot area corresponds to the location of the $1\text{-}1^{st}$ spot area, the brightness of second synthetic spot area may be calculated by using the brightness of the $1\text{-}2^{nd}$ spot area and the brightness of the $2\text{-}2^{nd}$ spot area, in a case where the $1\text{-}2^{nd}$ spot area and the $2\text{-}2^{nd}$ spot area are generated due to a same factor, and the brightness of the first synthetic spot area may be calculated by using the brightness of the $1\text{-}1^{st}$ spot area and the brightness of the $2\text{-}1^{st}$ spot area, in a case where the $1\text{-}1^{st}$ spot area and the $2\text{-}1^{st}$ spot area are generated due to a same factor. Accordingly, in such an embodiment, the substrate inspection apparatus 10 may increase the accuracy of the detection of defects and may detect all defects without missing any of the defects.

FIG. 9 is a flowchart of the method of inspecting a substrate, according to an embodiment.

As illustrated in FIG. 9, in operation S910, the substrate inspection apparatus 10 may obtain the first image data with respect to the first substrate by capturing the first substrate, and in operation S920, based on the first image data, the substrate inspection apparatus 10 may obtain the $1\text{-}1^{st}$ information with respect to the $1\text{-}1^{st}$ spot area on the first substrate and the $1^{st}$ information with respect to the $1^{st}$ non-spot area on the first substrate. In operation S930, the substrate inspection apparatus 10 may obtain the second image data with respect to the second substrate by capturing the second substrate, and in operation S940, based on the second image data, the substrate inspection apparatus 10 may obtain the $2\text{-}1^{st}$ information with respect to the $2\text{-}1^{st}$ spot area on the second substrate on the location thereof corresponding to the location of the $1\text{-}1^{st}$ spot area on the first substrate and the $2^{nd}$ information with respect to the $2^{nd}$ non-spot area on the second substrate on the location thereof corresponding to the location of the $1^{st}$ non-spot area on the first substrate. Operations S910 through S940 correspond to operations S410 through S440 described above with reference to FIG. 4, respectively, and thus, any repetitive detailed descriptions thereof will be omitted.

In operation S950, the substrate inspection apparatus 10 may determine whether an average value of the brightness of the first substrate is different from an average value of the brightness of the second substrate.

In operation S960, when the average value of the brightness of the first substrate is different from the average value of the brightness of the second substrate, the substrate inspection apparatus 10 may correct the brightness of the first substrate and the brightness of the second substrate in a way such that the center of the brightness graph of the first substrate becomes the same as the center of the brightness graph of the second substrate.

Accordingly, in operation S961, the substrate inspection apparatus 10 may obtain the $1\text{-}1^{st}$ correction information corrected from the $1\text{-}1^{st}$ information. In detail, the substrate inspection apparatus 10 may obtain the corrected brightness of the $1\text{-}1^{st}$ spot area. In operation S962, the substrate inspection apparatus 10 may obtain the $2\text{-}1^{st}$ correction information corrected from the $2\text{-}1^{st}$ information. In an embodiment, the substrate inspection apparatus 10 may obtain the corrected brightness of the $2\text{-}1^{st}$ spot area. In operation S963, the substrate inspection apparatus 10 may obtain the $1^{st}$ correction information corrected from the $1^{st}$ information. In an embodiment, the substrate inspection apparatus 10 may obtain the corrected brightness of the $1^{st}$ non-spot area. In operation S964, the substrate inspection apparatus 10 may obtain the $2^{nd}$ correction information corrected from the $2^{nd}$ information. In an embodiment, the substrate inspection apparatus 10 may obtain the corrected brightness of the $2^{nd}$ non-spot area.

In operation S970, the substrate inspection apparatus 10 may obtain the synthetic image data by using the $1\text{-}1^{st}$ correction information, the $2\text{-}1^{st}$ correction information, the $1^{st}$ correction information, and the $2^{nd}$ correction information. In an embodiment, the substrate inspection apparatus 10 may obtain the synthetic image data by using the corrected brightness of the $1\text{-}1^{st}$ spot area, the corrected brightness of the $2\text{-}1^{st}$ spot area, the corrected brightness of the $1^{st}$ non-spot area, and the corrected brightness of the $2^{nd}$ non-spot area.

When the average value of the brightness of the first substrate is different from the average value of the brightness of the second substrate, a result corresponding to a result generated by assigning a weight to an unintended substrate may be generated during operation of obtaining the synthetic image data. In an embodiment of the method of inspecting a substrate, the substrate inspection apparatus 10 may obtain the synthetic image data by using the $1\text{-}1^{st}$ correction information, the $2\text{-}1^{st}$ correction information, the $1^{st}$ correction information, and the $2^{nd}$ correction information. Thus, it may be prevented to generate a result that may be generated by assigning a weight to an unintended substrate, and thus, the accuracy of the synthetic image data may be increased.

In operation S980, when the average value of the brightness of the first substrate is not different from the average value of the brightness of the second substrate, the substrate inspection apparatus 10 may obtain the synthetic image data by using the $1\text{-}1^{st}$ information, the $2\text{-}1^{st}$ information, the $1^{st}$ information, and the $2^{nd}$ information. In an embodiment, the substrate inspection apparatus 10 may obtain the synthetic image data by using an uncorrected brightness of the $1\text{-}1^{st}$ spot area, an uncorrected brightness of the $2\text{-}1^{st}$ spot area, an uncorrected brightness of the $1^{st}$ non-spot area, and an uncorrected brightness of the $2^{nd}$ non-spot area.

According to embodiments of the invention, as described above, a substrate inspection apparatus and a method of inspecting a substrate may increase the degree of detection of a spot generated in a same location with respect to a plurality of substrates.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A substrate inspection apparatus comprising:
   a light source which radiates light onto a first substrate and a second substrate;
   an image sensor which obtains first image data with respect to the first substrate by capturing the first substrate based on the light scattered, emitted, or reflected from the first substrate and obtains second image data with respect to the second substrate by capturing the second substrate based on the light scattered, emitted, or reflected from the second substrate; and a processor which obtains synthetic image data by using the first image data and the second image data, wherein the synthetic image data are image data with respect to a virtual synthetic substrate, wherein the processor obtains first first spot information with respect to a first first spot area on the first substrate and first non-spot information with respect to a first non-spot area on the first substrate, based on the first image data, obtains first second spot information with respect to a first second spot area on a location on the second substrate corresponding to a location of the first first spot area on the first substrate and second non-spot information with respect to a second non-spot area on a location on the second substrate corresponding to a location of the first non-spot area on the first substrate, based on the second image data, and obtains the synthetic image data by using the first first spot information, the first second spot information, the first non-spot information, and the second non-spot information, wherein the substrate inspection apparatus provides the synthetic image data to a user.

2. The substrate inspection apparatus of claim 1, wherein the first first spot information includes a location of the first first spot area, a size of the first first spot area, a shape of the first first spot area, and a brightness of the first first spot area, the first second spot information includes a location of the first second spot area, a size of the first second spot area, a shape of the first second spot area, and a brightness of the first second spot area, the first non-spot information includes a location of the first non-spot area and a brightness of the first non-spot area, and the second non-spot information includes a location of the second non-spot area and a brightness of the second non-spot area.

3. The substrate inspection apparatus of claim 2, wherein the processor calculates a first average value which is an average of the brightness of the first first spot area and the brightness of the first second spot area, and a second average value which is an average of the brightness of the first non-spot area and the brightness of the second non-spot area, and obtains the synthetic image data including information with respect to a first synthetic spot area corresponding to the first first spot area and having a same brightness as the first average value and information with respect to a synthetic non-spot area corresponding to the first non-spot area and having a same brightness as the second average value.

4. The substrate inspection apparatus of claim 2, wherein the processor is further configured to:

calculate a first normal value and a second normal value, wherein the first normal value is obtained by normalizing a sum of the brightness of the first first spot area and the brightness of the first second spot area, and the second normal value is obtained by normalizing a sum of the brightness of the 1st non-spot area and the brightness of the second non-spot area; and obtain the synthetic image data including information with respect to a first synthetic spot area corresponding to the first first spot area and having a same brightness as the first normal value and information with respect to a synthetic non-spot area corresponding to the first non-spot area and having a same brightness as the second normal value.

5. The substrate inspection apparatus of claim 4, wherein the processor is further configured to calculate the first normal value and the second normal value by subtracting a same value from each of the sum of the brightness of the first first spot area and the brightness of the first second spot area and the sum of the brightness of the first non-spot area and the brightness of the second non-spot area, such that an average value of the first normal value and the second normal value is the same as an average value of a brightness of the first substrate and a brightness of the second substrate.

6. The substrate inspection apparatus of claim 2, wherein the processor is further configured to:

calculate a first correction value and a second correction value, wherein the first correction value is a sum of a value obtained by multiplying the brightness of the first first spot area by a first weight and a value obtained by multiplying the brightness of the first second spot area by a second weight different from the first weight, and the second correction value is a sum of a value obtained by multiplying the brightness of the first non-spot area by the first weight and a value obtained by multiplying the brightness of the second non-spot area by the second weight; and obtain the synthetic image data including information with respect to a first synthetic spot area corresponding to the first first spot area and having a same brightness as the first correction value and information with respect to a synthetic non-spot area corresponding to the first non-spot area and having a same brightness as the second correction value.

7. The substrate inspection apparatus of claim 6, wherein, when a value obtained by subtracting the brightness of the first non-spot area from the brightness of the first first spot area is less than a value obtained by subtracting the brightness of the second non-spot area from the brightness of the first second spot area, the first weight is less than the second weight.

8. The substrate inspection apparatus of claim 2, wherein the processor obtains second first spot information with respect to a second first spot area on the first substrate, based on the first image data, and obtains second second spot information with respect to a second second spot area on the second substrate, based on the second image data, the second first spot information includes a location of the second first spot area, a size of the second first spot area, a shape of the second first spot area, and a brightness of the second first spot area, and the second second spot information includes a location of the second second spot area, a size of the second second spot area, a shape of the second second spot area, and a brightness of the second second spot area.

9. The substrate inspection apparatus of claim 8, wherein the processor calculates a third average value and a second average value when the location of the first first spot area overlaps the location of the second first spot area, the location of the first second spot area overlaps the location of the second second spot area, the shape of the first first spot area is the same as the shape of the first second spot area, and the shape of the second first spot area is the same as the shape of the second second spot area, wherein the third average value is an average of the brightness of the second first spot area and the brightness of the second second spot area, and the second average value is an average of the brightness of the first non-spot area and the brightness of the second non-spot area, and obtains the synthetic image data including information with respect to a second synthetic spot area corresponding to the second first spot area and having a same brightness as the third average value and information with respect to a synthetic non-spot area corresponding to the first non-spot area and having a same brightness as the second average value.

10. The substrate inspection apparatus of claim 1, wherein the processor corrects a brightness of the first substrate and a brightness of the second substrate in a way such that a center of a brightness graph of the first substrate becomes the same as a center of a brightness graph of the second substrate, when an average value of the brightness of the first substrate is different from an average value of the brightness of the second substrate, obtains first first correction spot information corrected from the first first information, obtains first second correction spot information corrected from the first second information, obtains first correction non-spot information corrected from the first non-spot information, obtains second correction non-spot information corrected from the second non-spot information, and obtains the synthetic image data by using the first first correction spot information, the first second correction spot information, the first correction non-spot information, and the second non-spot correction information.

11. A method of inspecting a substrate, the method comprising:

radiating light onto a first substrate;

obtaining first image data with respect to the first substrate by capturing the first substrate based on the light scattered, emitted, or reflected from the first substrate;

obtaining first first spot information with respect to a first first spot area on the first substrate and first non-spot information with respect to a first non-spot area on the first substrate, based on the first image data;

radiating light onto a second substrate;

obtaining second image data with respect to the second substrate by capturing the second substrate based on the light scattered, emitted, or reflected from the second substrate;

obtaining first second spot information with respect to a first second spot area on a location on the second substrate corresponding to a location of the first first spot area on the first substrate and second non-spot information with respect to a second non-spot area on a location on the second substrate corresponding to a location of the first non-spot area on the first substrate, based on the second image data;

obtaining synthetic image data by using the first first spot information, the first second spot information, the first non-spot information, and the second non-spot information, wherein the synthetic image data are image data with respect to a virtual synthetic substrate; and providing the synthetic image data to a user.

12. The method of claim 11, wherein the first first spot information includes a location of the first first spot area, a size of the first first spot area, a shape of the first first spot area, and a brightness of the first first spot area, the first second spot information includes a location of the first second spot area, a size of the first second spot area, a shape of the first second spot area, and a brightness of the first second spot area, the first non-spot information includes a location of the first non-spot area and a brightness of the first non-spot area, and the second non-spot information includes a location of the second non-spot area and a brightness of the second non-spot area.

13. The method of claim 12, wherein the obtaining the synthetic image data includes:

calculating a first average value and a second average value, wherein the first average value is an average of the brightness of the first first spot area and the brightness of the first second spot area, and the second average value is an average of the brightness of the first non-spot area and the brightness of the second non-spot area; and obtaining the synthetic image data including information with respect to a first synthetic spot area corresponding to the first first spot area and having a same brightness as the first average value and information with respect to a synthetic non-spot area corresponding to the first non-spot area and having a same brightness as the second average value.

14. The method of claim 12, wherein the obtaining the synthetic image data includes:

calculating a first normal value and a second normal value, wherein the first normal value is obtained by normalizing a sum of the brightness of the first first spot area and the brightness of the first second spot area, and the second normal value is obtained by normalizing a sum of the brightness of the first non-spot area and the brightness of the second non-spot area; and obtaining the synthetic image data including information with respect to a first synthetic spot area corresponding to the first first spot area and having a same brightness as the first normal value and information with respect to a synthetic non-spot area corresponding to the first non-spot area and having a same brightness as the second normal value.

15. The method of claim 14, wherein the calculating of the first normal value and the second normal value includes calculating the first normal value and the second normal value by subtracting a same value from each of the sum of the brightness of the first first spot area and the brightness of the first second spot area and the sum of the brightness of the first non-spot area and the brightness of the second non-spot area, such that an average value of the first normal value and the second normal value is the same as an average value of a brightness of the first substrate and a brightness of the second substrate.

16. The method of claim 12, wherein the obtaining the synthetic image data includes:

calculating a first correction value and a second correction value, wherein the first correction value is a sum of a value obtained by multiplying the brightness of the first first spot area by a first weight and a value obtained by multiplying the brightness of the first second spot area by a second weight different from the first weight, and the second correction value is a sum of a value obtained by multiplying the brightness of the first non-spot area by the first weight and a value obtained by multiplying the brightness of the second non-spot area by the second weight; and obtaining the synthetic image data including information with respect to a first synthetic spot area corresponding to the first first spot area and having a same brightness as the first correction value and information with respect to a synthetic non-spot area corresponding to the first non-spot area and having a same brightness as the second correction value.

17. The method of claim 16, wherein, when a value obtained by subtracting the brightness of the first non-spot area from the brightness of the first first spot area is less than a value obtained by subtracting the brightness of the second non-spot area from the brightness of the first second spot area, the first weight is less than the second weight.

18. The method of claim 12, further comprising:

obtaining second first spot information with respect to a second first spot area on the first substrate, based on the first image data; and obtaining second second spot information with respect to a second second spot area on the second substrate, based on the second image data, wherein the second first spot information includes a location of the second first spot area, a size of the second first spot area, a shape of the second first spot area, and a brightness of the second first spot area, and the second second spot information includes a location of the second second spot area, a size of the second second spot area, a shape of the second second spot area, and a brightness of the second second spot area.

19. The method of claim 18, wherein the obtaining the synthetic image data includes:

calculating a third average value that is an average of the brightness of the second first spot area and the brightness of the second second spot area and a second average value that is an average of the brightness of the first non-spot area and the brightness of the second non-spot area, when the location of the first first spot area overlaps the location of the second first spot area, the location of the first second spot area overlaps the location of the second second spot area, the shape of the first first spot area is the same as the shape of the first second spot area, and the shape of the second first spot area is the same as the shape of the second second spot area; and obtaining the synthetic image data including information with respect to a second synthetic spot area corresponding to the second first spot area and having a same brightness as the third average value and information with respect to a synthetic non-spot area corresponding to the first non-spot area and having a same brightness as the second average value.

20. The method of claim 11, further comprising, between the obtaining of the second non-spot information and the obtaining the synthetic image data, correcting a brightness of the first substrate and a brightness of the second substrate in a way such that a center of a brightness graph of the first substrate becomes the same as a center of a brightness graph of the second substrate, when an average value of the brightness of the first substrate is different from an average value of the brightness of the second substrate, wherein the obtaining the synthetic image data includes:

obtaining first first correction spot information corrected from the first first spot information;

obtaining first second correction spot information corrected from the first second spot information;

obtaining first correction non-spot information corrected from the first non-spot information;

obtaining second correction non-spot information corrected from the second non-spot information; and obtaining the synthetic image data by using the first first correction spot information, the first second correction spot information, the first correction non-spot information, and the second correction non-spot information.

* * * * *